(12) United States Patent
Maki et al.

(10) Patent No.: US 7,451,285 B2
(45) Date of Patent: Nov. 11, 2008

(54) COMPUTER SYSTEMS, MANAGEMENT COMPUTERS AND STORAGE SYSTEM MANAGEMENT METHOD

(75) Inventors: Nobuhiro Maki, Yokohama (JP); Makoto Uchikado, Yokohama (JP); Kazuhiko Watanabe, Yokohama (JP); Yuri Hiraiwa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 190 days.

(21) Appl. No.: 11/485,971

(22) Filed: Jul. 14, 2006

(65) Prior Publication Data

US 2007/0271430 A1 Nov. 22, 2007

(30) Foreign Application Priority Data

May 16, 2006 (JP) ............................ 2006-136239

(51) Int. Cl.
*G06F 12/00* (2006.01)
(52) U.S. Cl. ........................................ 711/162; 711/161
(58) Field of Classification Search ................. 711/162, 711/161
See application file for complete search history.

(56) References Cited

U.S. PATENT DOCUMENTS

| | | | | |
|---|---|---|---|---|
| 6,209,002 | B1 * | 3/2001 | Gagne et al. ................. | 707/204 |
| 6,745,303 | B2 * | 6/2004 | Watanabe ..................... | 711/161 |
| 7,130,975 | B2 * | 10/2006 | Suishu et al. ................. | 711/162 |
| 2003/0229764 | A1 * | 12/2003 | Ohno et al. .................. | 711/147 |
| 2005/0050115 | A1 * | 3/2005 | Kekre .......................... | 707/204 |
| 2007/0198790 | A1 * | 8/2007 | Asano et al. ................. | 711/162 |
| 2007/0198791 | A1 * | 8/2007 | Iwamura et al. ............. | 711/162 |

FOREIGN PATENT DOCUMENTS

JP 2005-18506 1/2005

* cited by examiner

*Primary Examiner*—Reginald G Bragdon
*Assistant Examiner*—Mehdi Namazi
(74) *Attorney, Agent, or Firm*—Mattingly, Stanger, Malur & Brundidge, P.C.

(57) ABSTRACT

A computer includes a management computer connected to a host computer, first and second primary storage systems, first and second secondary storage systems, a primary external storage system connected to the first and second primary storage systems and a secondary external storage system connected to the first and second secondary storage systems. The management computer controls to start copying as processing for storing copied data in the second storage area into a fourth storage area in response to a command for starting processing for storing copied data in the first storage area into a third storage area.

21 Claims, 24 Drawing Sheets

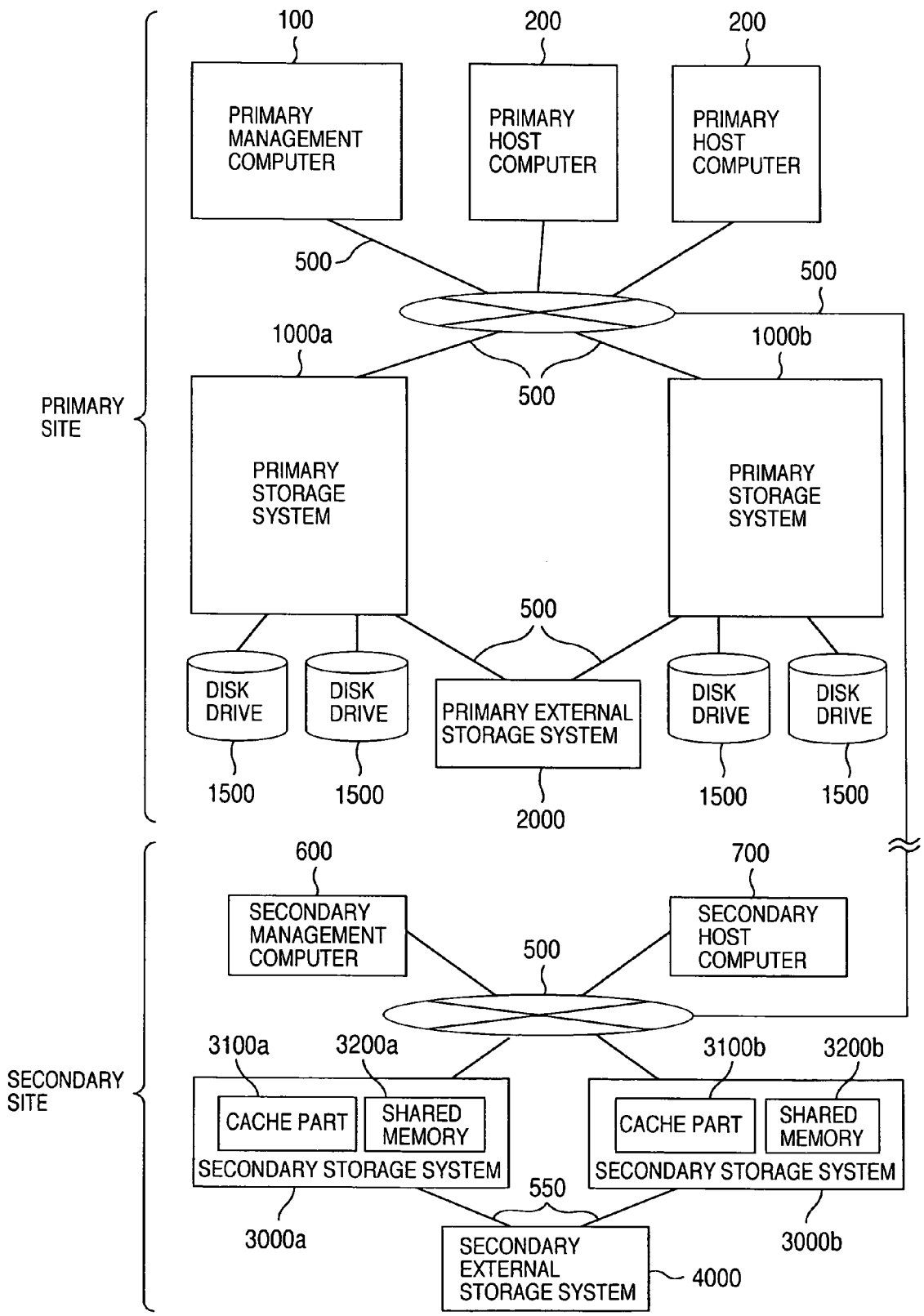

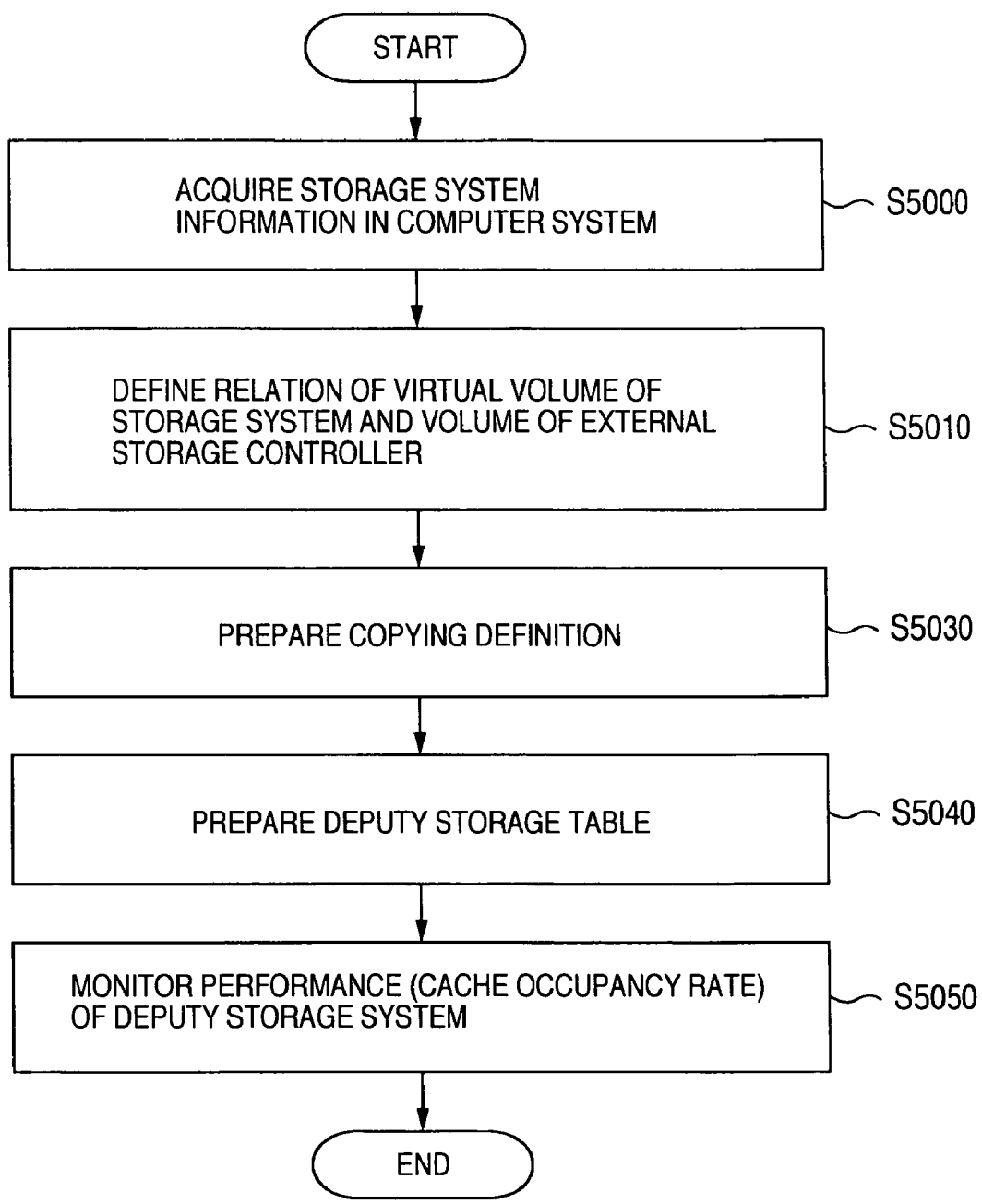

FIG.17

| DEPUTY STORAGE TABLE | | | VIRTUAL STORAGE SYSTEM AVAILABLE AS DEPUTY STORAGE SYSTEM | | | | | 115 |
|---|---|---|---|---|---|---|---|---|
| | | | STORAGE SYSTEM ID1 | STORAGE SYSTEM ID2 | ... | STORAGE SYSTEM IDM | DEFINITION TOTAL | ASSIGNED |
| | | | VIRTUAL VOLUME ID1 | VIRTUAL VOLUME ID2 | ... | VIRTUAL VOLUME IDM | | |
| | | | INVALIDITY FLAG | INVALIDITY FLAG | ... | INVALIDITY FLAG | | |
| DEFINITION STORAGE SYSTEM | STORAGE SYSTEM ID1 | VIRTUAL VOLUME ID1 | 1 | | ... | | 1 | 1 |
| | STORAGE SYSTEM ID2 | VIRTUAL VOLUME ID2 | | 1 | ... | | 2 | |
| | ... | ... | ... | ... | ... | ... | ... | |
| | STORAGE SYSTEM IDN | VIRTUAL VOLUME IDN | 1 | 1 | ... | 1 | 3 | 1 |
| DEPUTY TOTAL | | | 2 | 2 | ... | 1 | | |
| NUMBER OF DEPUTY STORAGE ASSIGNED VIRTUAL VOLUMES | | | 4 | 4 | ... | 1 | | |
| PERFORMANCE (CACHE OCCUPANCY RATE) | | | 30% | 25% | ... | 55% | | |
| PERFORMANCE DIFFERENCE | | | +10% | 0% | ... | -10% | | |

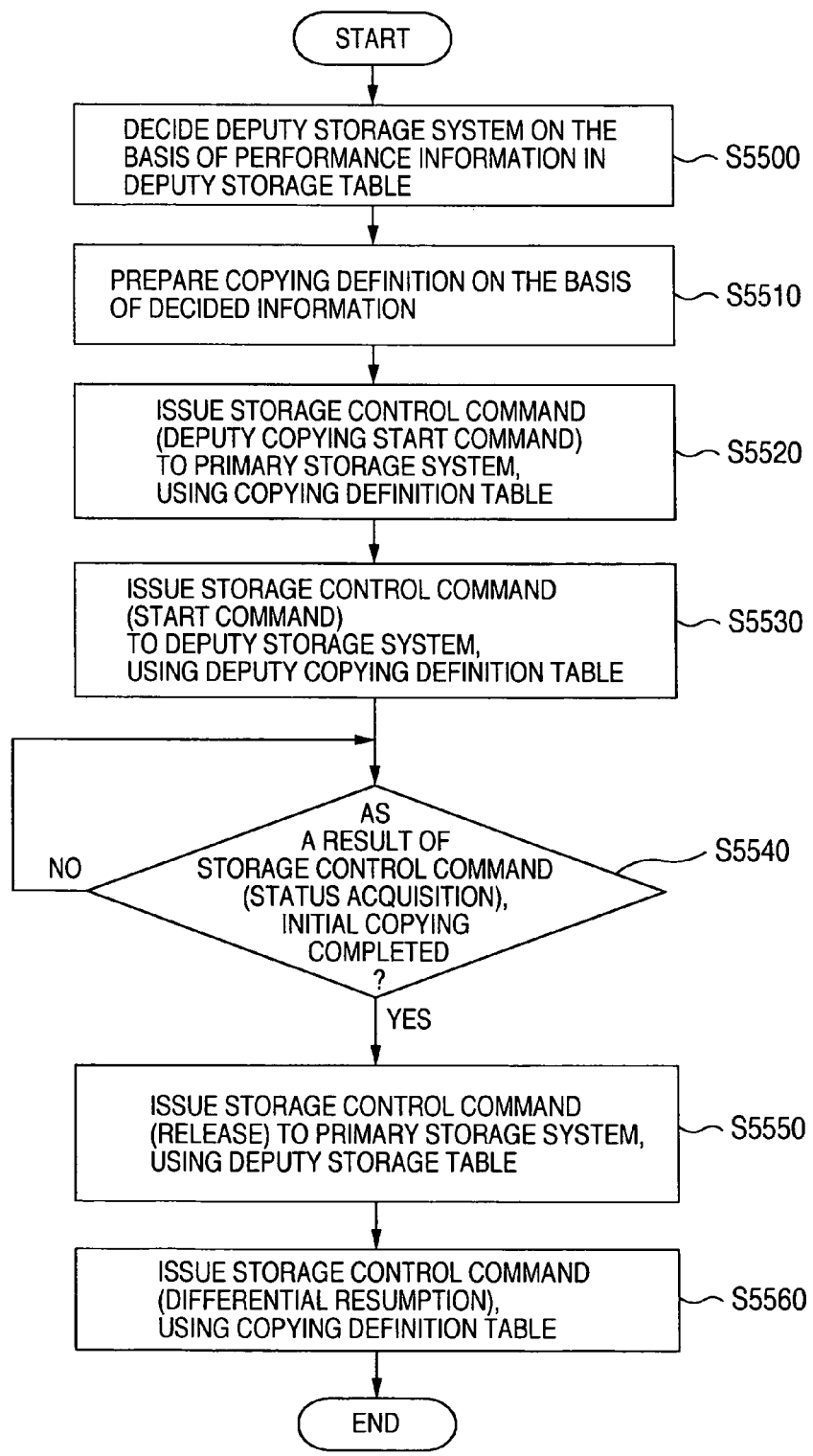

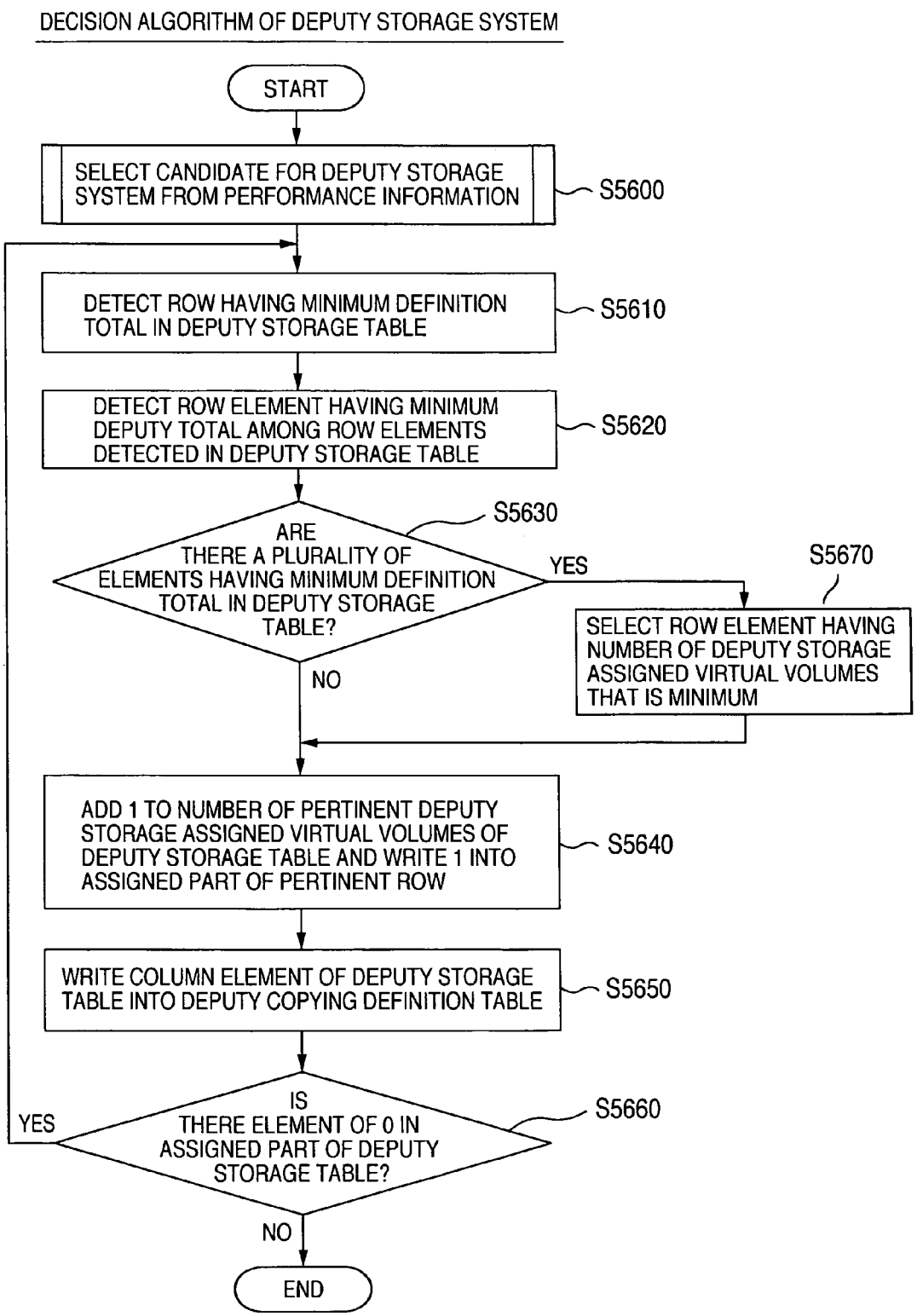

PROCEDURE FROM TIME THAT COPYING IS STARTED TO TIME THAT IT IS SHIFTED TO REGULAR COPYING IN SECOND EMBODIMENT

COMPUTER SYSTEMS, MANAGEMENT COMPUTERS AND STORAGE SYSTEM MANAGEMENT METHOD

INCORPORATION BY REFERENCE

The present application claims priority from Japanese application JP2006-136239 filed on May 16, 2006, the content of which is hereby incorporated by reference into this application.

BACKGROUND OF THE INVENTION

The present invention relates to computer systems including host computers and a plurality of storage systems capable of making data communication therebetween through a network, the plurality of computer systems being installed in physically separated places and configured so that data is copied between the storage systems of the computer systems in different places, management computers and a storage system management method.

Recently, the importance of an information system of a company and data used therein is increased, so that the disaster recovery technique for recovering a computer system falling in failure due to disaster and data used therein is utilized in the company. A remote copying configuration has been proposed as the representative system configuration for realizing the disaster recovery technique.

JP-A-2005-18506, for example, discloses the technique that data issued by a host computer is received by a storage system and the storage system stores the data therein and transfers the data to a different storage system installed in a physically separated place to be preserved. In this configuration, even if a computer system is struck by disaster during operation to fall in failure, the data copied into the storage system installed in the geographically separated place can be used to recover the computer system in a relatively short time.

SUMMARY OF THE INVENTION

In the following description, constituent elements representing a copy source of data are designated by a name with "primary" added thereto as a prefix and constituent elements representing a copy target of data are designated by a name with "secondary" added thereto as a prefix. For example, a primary storage system is a storage system for managing logical volumes of copy source. The logical volumes are storage areas in the storage system of the copy source just after starting of operation.

The remote copying is performed between a primary storage system and a secondary storage system. The remote copying represents data copying processing for copying write data received by a primary storage system and written in a logical volume by a primary management computer or a primary host computer into a logical volume of a secondary storage system. In general, there are two kinds of remote copying methods including synchronous remote copying and asynchronous remote copying.

The synchronous remote copying is the copying method that a response to write data from a host computer received by a primary storage system is notified to the host computer after the write data has been copied into a secondary storage system. The synchronous remote copying is featured by the fact that the data is not lost in the secondary storage system since completion of data copying into the secondary storage system can be secured upon the response of the data writing to the host.

In contrast, the data copying time between the storage systems influences the data writing completion time of the host (time required from issue of data to the storage system to reception of completion report) and accordingly a data copying distance is limited.

On the other hand, the asynchronous remote copying is the copying method that the response of the write data from the host computer received by the primary storage system is reported to the host computer when the primary storage system has received the data from the host computer. The asynchronous remote copying does not influence the data writing completion time to the secondary storage system and accordingly long-distance data copying can be attained. In contrast, the data writing to the secondary storage system is not synchronized with the data writing completion to the host computer and accordingly there is a possibility that data is lost in the secondary storage system.

Further, in order to make it possible to execute an application program (AP) from the secondary host computer by using data copied into the secondary storage system, it is necessary to guarantee the writing order of data issued by the primary host computer between the primary storage system and the secondary storage system. The control for guaranteeing the writing order of data in the remote copying is named consistency control.

The remote copying is classified into initial copying and regular copying.

In the initial copying, data is copied from the logical volume of the storage system of the copy source into a logical volume of the storage system of the copy target just after starting of operation. The initial copying is to make the contents of the logical volume of the copy source in the primary storage system equal to those of the logical volume of the copy target in the secondary storage system. That is, when the initial copying is completed, data of the copy source is made equal to data of the copy target.

When the initial copying is started, the primary storage system reads out data in the logical volume of copy source therein and transfers the data to the secondary storage system. The secondary storage system writes the received data into the logical volume of the copy target. In this connection, since the initial copying is to copy data preserved in the logical volume of the copy source, the consistency control for guaranteeing the writing order of the host computer is not performed. The detailed procedure for the initial copying is described later.

After completion of the initial copying, the regular copying is started. In the regular copying, write data received by the primary storage system from a primary management computer or a primary host computer is transferred to the secondary storage system. The secondary storage system writes the transferred data into the logical volume of the copy target. When the consistency control is performed, the writing order of data is adjusted among the secondary storage systems to write the data into the logical volume of the copy target.

In the initial copying, it is necessary that the storage system of the copy source reads out all data in a plurality of logical volumes that sometimes exceed several hundred GB to be transferred to the copy target and accordingly the storage system is required to assign considerable processing resources to the initial copying processing. As a result, the data access performance of the host computers for making data access to the storage system is deteriorated.

FIG. 32 illustrates operation of the consistency control by primary and secondary storage systems. In FIG. 32, the remote copying is performed from two primary storage systems to two secondary storage systems. Data in four logical volumes provided in the primary storage systems are copied into four logical volumes provided in the secondary storage systems in the writing order of data issued by the primary host computer (not shown).

As contrasted with the regular copying that the write data sent to the logical volume of the copy source by primary management computer (not shown) or primary host computer is copied into the logical volume of the copy target, all the contents of the logical volumes of the copy source are copied into the logical volumes of the copy target in the initial copying. Accordingly, the primary storage system is required to transfer a large quantity of data. This requirement not only imposes a great deal of load on the storage system but also degrades the access performance of the primary host computer for making data access to the primary storage system.

Accordingly, it is a primary object of the present invention to suppress deterioration in performance of primary management computer and primary host computer caused by influence of the initial copying.

According to the present invention, the computer system comprises a computer, a first primary storage system connected to the computer and providing a first virtual storage area to the computer, a second primary storage system connected to the first primary storage system and including a first real storage area corresponding to the first virtual storage area, a third primary storage system connected to the second primary storage system and providing a second virtual storage area corresponding to the first real storage area to an external apparatus, a first secondary storage system connected to the first and second primary storage systems through a communication line and including a third storage area and a management computer connected to the first and second primary storage systems and the computer. The third primary storage system responds to a write request of write data to the first virtual storage area corresponding to the first real storage area, received from the computer, to store the data into the first real storage area. The management computer instructs the second primary storage system to copy data stored in the first real storage area into the third storage area through the second virtual storage area when the data is copied into the third storage area through the communication line and instructs the first primary storage system to copy the write data received from host computer into the third storage area through the first virtual storage area. Other measures are described later.

According to the present invention, since the initial copying from first memory area to third memory area is replaced with copying from second memory area to fourth memory area, load on the first primary storage system having the first memory area is lightened. Consequently, deterioration in the performance, caused by influence of the initial copying, of the primary management computer and the primary host computer accessed to the first primary storage system can be suppressed.

Other objects, features and advantages of the invention will become apparent from the following description of the embodiments of the invention taken in conjunction with the accompanying drawings.

BRIEF DESCRIPTION OF THE DRAWINGS

FIG. 1 is a schematic diagram illustrating a computer system according to a first embodiment of the present invention;

FIG. 16 is a flow chart showing a setting procedure in the embodiment of the present invention;

FIG. 17 shows an example of deputy storage table in the embodiment of the present invention;

FIG. 18 is a flow chart showing a processing procedure made from time that copying is started by management computer to time that it is shifted to the regular copying in the embodiment of the present invention;

FIG. 19 is a flow chart showing decision algorithm of a deputy storage system in the embodiment of the present invention;

DESCRIPTION OF THE EMBODIMENTS

Figure 2A:
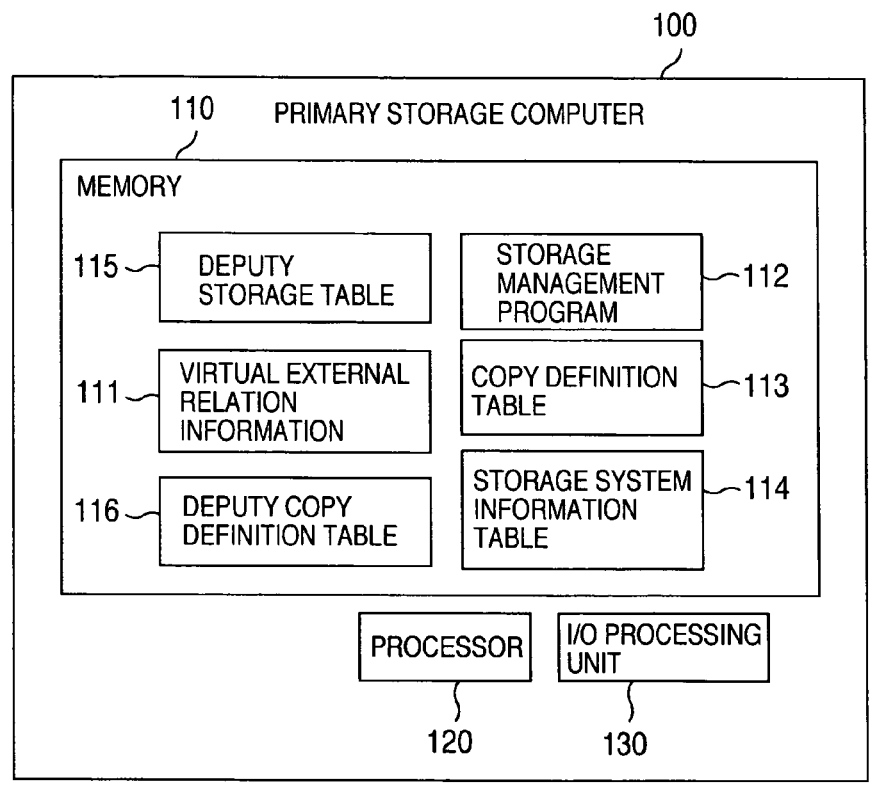
FIGS. 2A and 2B schematically illustrate a primary management computer and a primary host computer used in the computer system according to the first embodiment of the present invention, respectively.

An outline of embodiments is first described below.

In the embodiments, a plurality of computer systems installed in geographically separated places include a plurality of host computers, a plurality of storage systems and management computers for managing the plurality of storage systems to which the host computers and the management computers are connected.

The computer systems installed in the respective places can make transmission/reception of data one another through data communication line connected to their own storage systems and virtual storage systems having the virtualization function that logical volumes of storage systems (named external storage systems) different from their own storage system can be provided to the host computers virtually as their own logical volumes are provided in the respective places.

In the computer systems in which the plurality of virtual storage systems provide the same logical volumes (named shared volume) of the external storage systems as their own logical volumes to the host computers one another, remote copying is performed between the shared volumes of the virtual storage systems installed in different places.

Further, the initial copying just after the remote copying is performed in a virtual storage system (named a deputy storage system) different from the virtual storage system of the original copy target and the remote copying performed in the deputy storage system is ended after completion of the initial copying, so that the remote copying is performed in the virtual storage system of the original copy target.

As described above, the initial copying can be performed in the storage system different from that of the original copy target to thereby suppress deterioration in performance of the primary management computer and the primary host computer caused by influence of the initial copying.

More particularly, in the computer systems, since the logical volume in the external storage system is shared as the shared volume of the plurality of virtual storage systems, the remote copying using the other virtual storage system (deputy storage system) can be performed by the same copying processing as the remote copying by a different virtual storage system (second virtual storage system) sharing the logical volume, so that the remote copying can be performed without imposition of the load of the initial copying to be imposed on the second virtual storage system originally.

A first embodiment of the present invention is now described. The present invention is not limited to the first embodiment described below.

FIG. 1 is a schematic diagram illustrating a computer system according to the first embodiment. The computer systems are dividedly installed in two physically separated places of primary and secondary sites.

The computer system installed in the primary site includes a primary management computer 100, a plurality of primary host computers 200, primary storage systems 1000a and 1000b and a primary external storage system 2000.

Further, the computer system installed in the secondary site includes a secondary management computer 600, a secondary host computer 700, secondary storage systems 3000a and 3000b and a secondary external storage system 400.

The primary storage systems 1000a, 1000b, the primary management computer 100 and the primary host computers 200 are connected to one another through data communication lines 500. Further, the primary external storage system 2000 is connected to the primary storage systems 1000a, 1000b through data communication lines 550. However, the primary external storage system 2000 is not required to be connected to all of the primary storage systems 1000a, 1000b. Similarly, the secondary storage systems 3000a, 3000b, the secondary management computer 600 and the secondary host computer 700 are connected to one another through data communication lines 500.

Further, the secondary external storage system 4000 is connected to the secondary storage systems 3000a, 3000b through data communication lines 550. The computer systems divided in the primary and secondary sites are connected to each other through the data communication line 500. The secondary external storage system 4000 is not required to be connected to all of the secondary storage systems 3000a, 3000b.

The disk drives 1500 are physical data storage devices such as hard disk drive. The disk drives 1500 make writing and reading of data in accordance with an input/output command from a disk controller.

Figure 7:
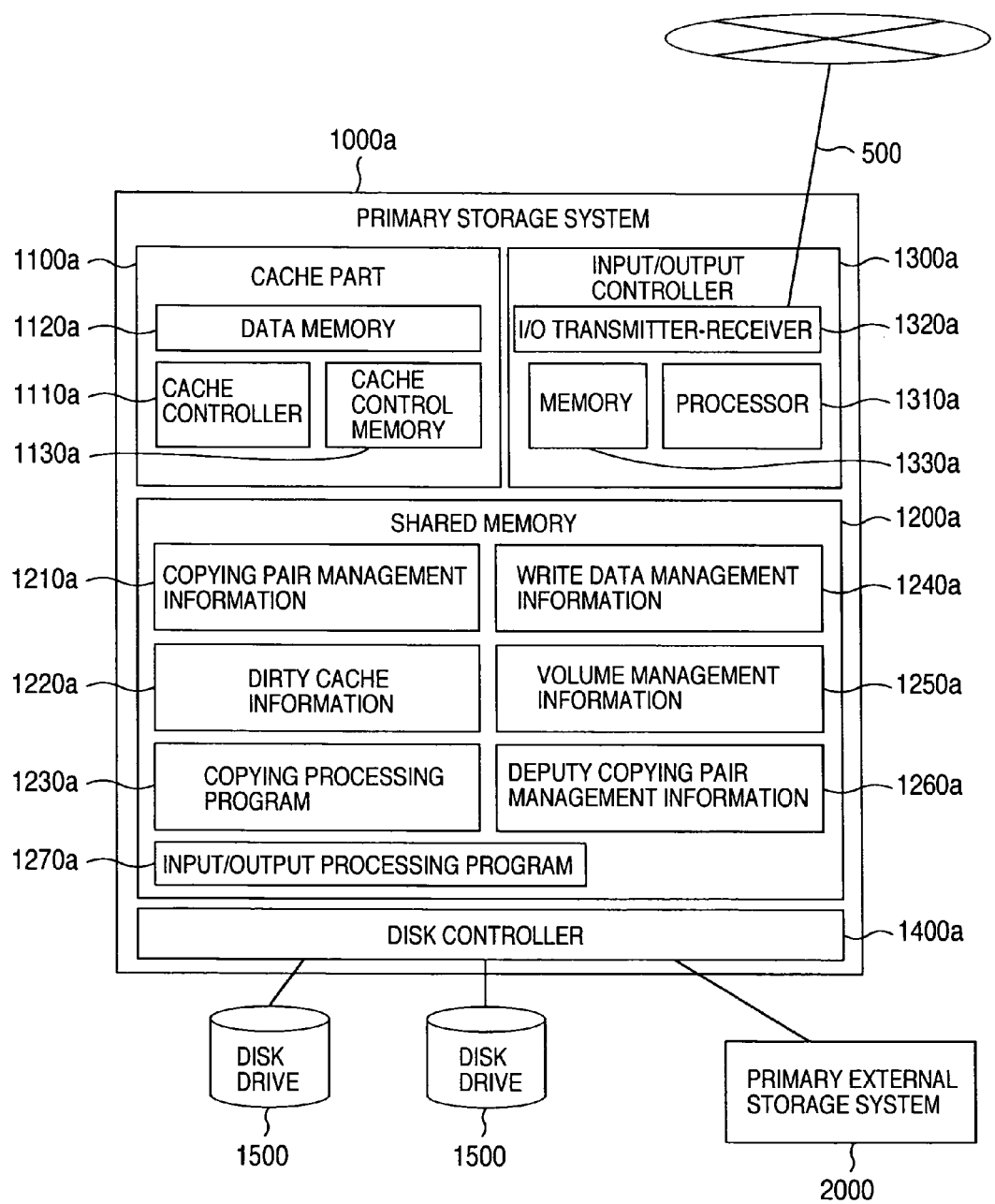
FIG. 7 is a schematic diagram illustrating a primary storage system used in the computer system according to the first embodiment of the present invention.

There are the primary storage systems 1000a, 1000b in the primary site. It is needless to say that the primary storage systems have the same configuration as described above and programs and control information stored therein are the same. FIG. 7 is also used to explain the primary storage system 1000b.

Further, the secondary storage systems 3000a, 3000b installed in the secondary site have the same configuration as that of the primary storage systems 1000a, 1000b installed in the primary site. The secondary management computer 600, the secondary host computer 700, the secondary storage systems 3000a, 3000b and the secondary external storage system 4000 hold the same information as the programs and control information held in the equivalent-computers and controllers in the primary site and accordingly description thereof is omitted.

The primary storage system 1000a is a system connected to the disk drives 1500. The secondary storage system 3000a is a system connected to the disk drives 1500.

Figure 2B:
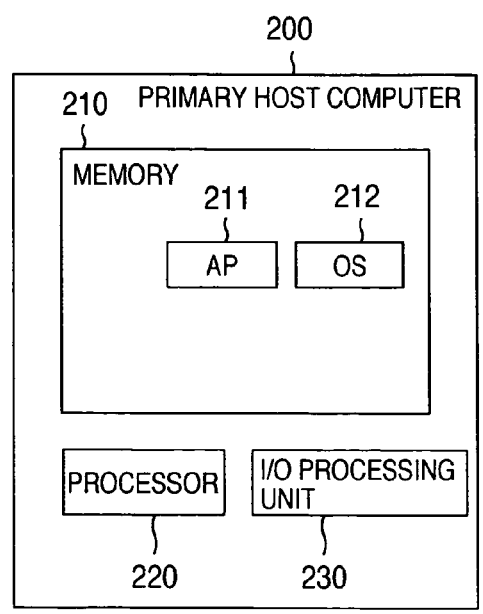

FIGS. 2A and 2B schematically illustrate the primary management computer and the primary host computer of the computer system, respectively. The primary management computer 100 shown in FIG. 2A includes a memory 110, a processor 120 and an I/O processing unit 130, which are connected to one another through an internal network (not shown). Further, virtual external relation information 111, storage management program 112, copying definition table 113, storage system information table 114, deputy storage table 115 and deputy copying definition table 116 are stored in the memory 110.

Although not shown, an operating system (OS) and an application program (AP) may be stored in the memory 110. The storage management program 112, the operating system and the application program are executed by the processor 120. The virtual external relation information 111, the copying definition table 113, the storage system management table 114, the deputy storage table 115 and the deputy copying definition table 116 are used when the processor 120 executes the storage management program. Similarly, the secondary management computer 600 has the same configuration as that of the primary management computer 100 and programs and data similar to those of the primary management computer 100 are stored in the memory thereof, although the configuration of the secondary management computer is not shown. The primary host computer 200 is described later with reference to FIG. 2B.

Figure 3:
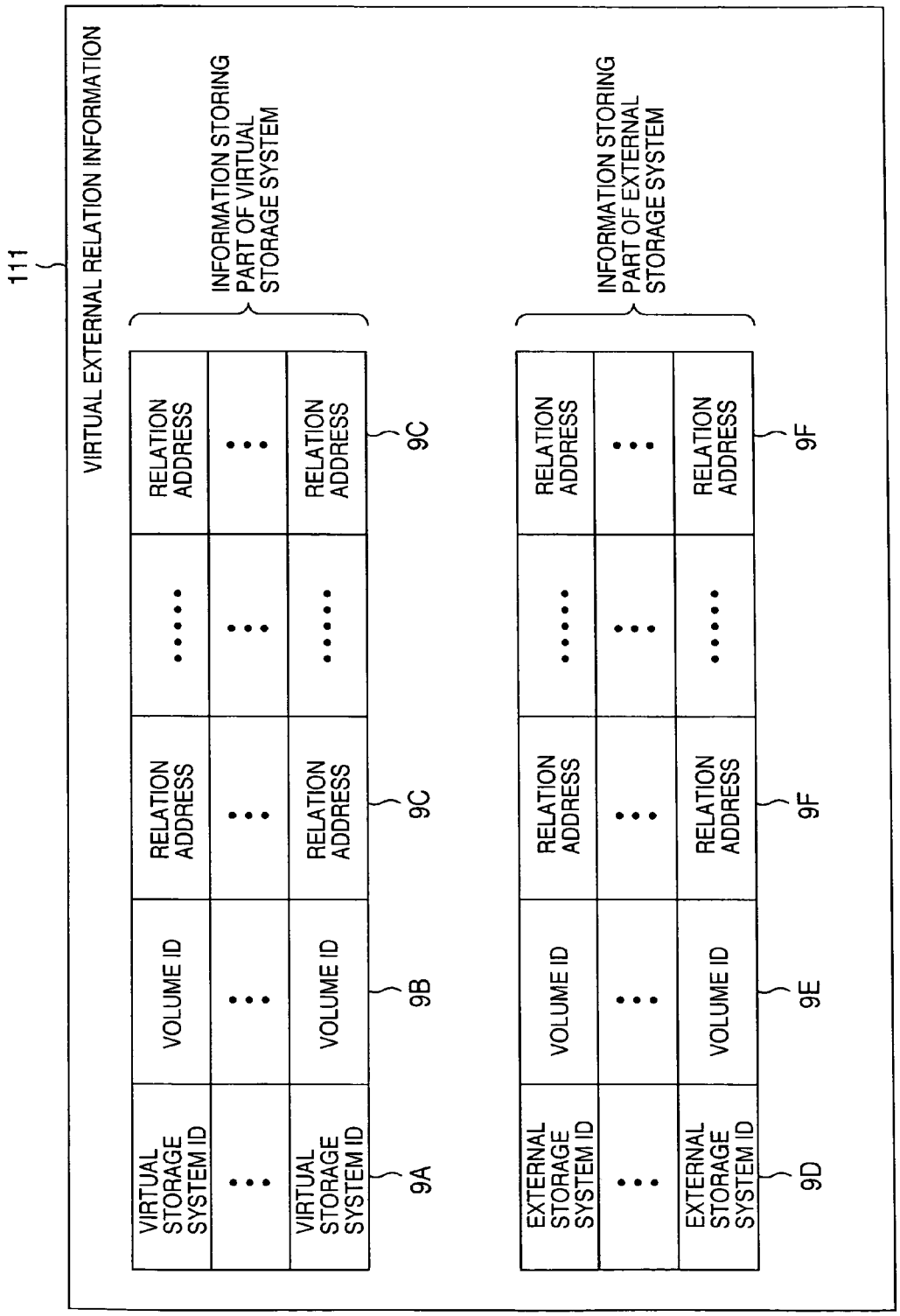
FIG. 3 shows virtual external relation information in the embodiment of the present invention.

FIG. 3 shows the virtual external relation information 111. The virtual external relation information is divided into two parts, that is, a part for holding information of the virtual storage system and a part for holding information of the external storage system.

The part for storing information of the virtual storage system is constituted by one or more elements including virtual storage system ID (9A) holding information for identifying the virtual storage system, volume ID (9B) for identifying volume in the virtual storage system and relation address (9C) indicating one element of the external storage system in the same table.

The part for storing information of the external storage system is also constituted by one or more elements including external storage system ID (9D) holding information for identifying the external storage system, volume ID (9E) for identifying volume in the external storage system and relation address (9F) indicating element of the virtual storage system in the same table.

The relation address (9C) is an address pointer for indicating relational volume in the external storage system. Similarly, the relation address (9F) is an address pointer for indicating relational volume in the virtual storage system. A plurality of relation addresses (9C) and (9F) may be provided in one element.

Figure 4:
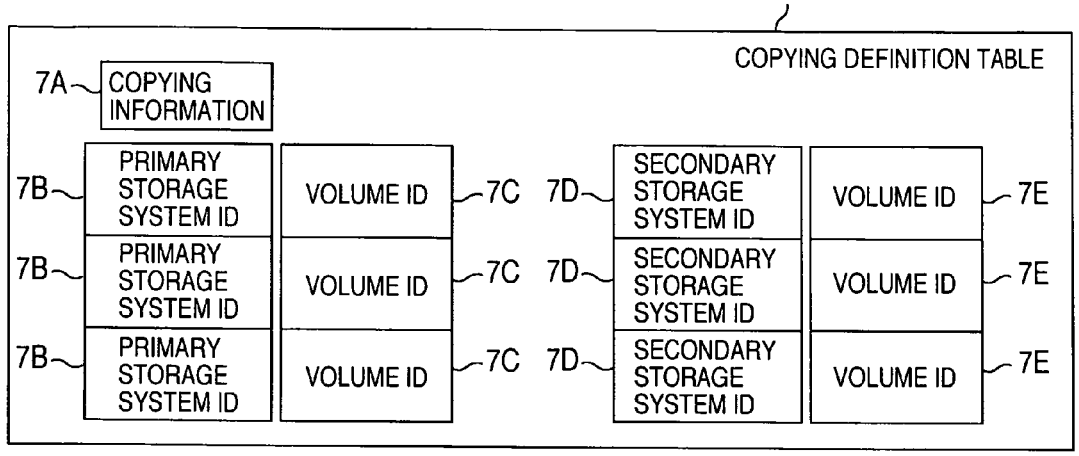
FIG. 4 shows a copying definition table in the embodiment of the present invention.

FIG. 4 shows the copying definition table 113. The copying definition table is a table for defining copying configuration to be performed and the number of the copying definition tables is the same as the number of remote copying to be performed. The copying definition table includes copying information (7A), a part for indicating information of copy source and a part for indicating information of copy target. The classification of copying is stored in the copying information. The part for indicating the copy source information includes primary storage system ID (7B) and volume ID (7C).

Further, the part for indicating the copy target information includes secondary storage system ID (7D) and volume ID (7E). Information for identifying the storage system is stored in the storage system ID. Similarly, information for uniquely identifying the volume in the same apparatus is stored in the volume ID.

Figure 5:
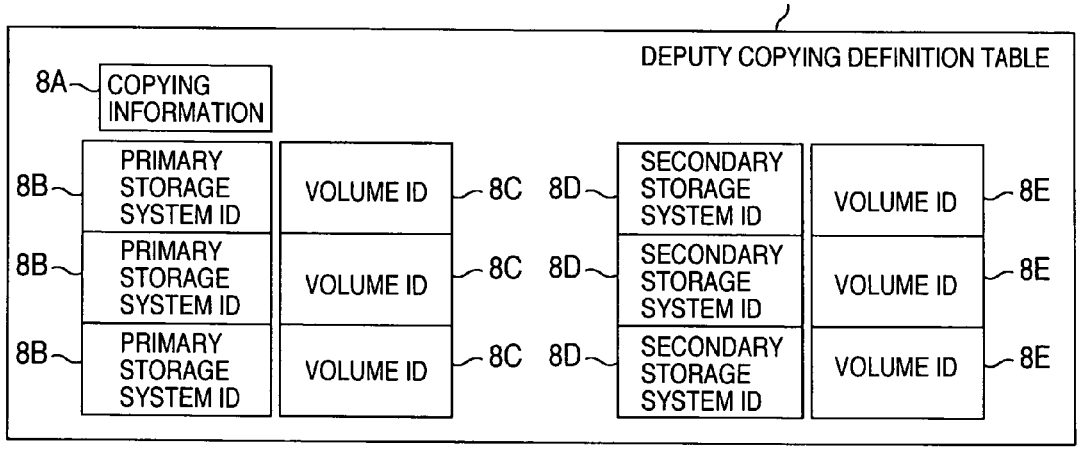
FIG. 5 shows a deputy copying definition table in the embodiment of the present invention.

FIG. 5 shows the deputy copying definition table 116. The deputy copying definition table 116 is a copying definition table used in deputy copying described later and has the same configuration as that of the copying definition table 113. That is, the deputy copying definition table 116 includes copying information (8A), primary storage system ID (8B), volume ID (8C), secondary storage system ID (8D) and volume ID (8E).

Figure 6:
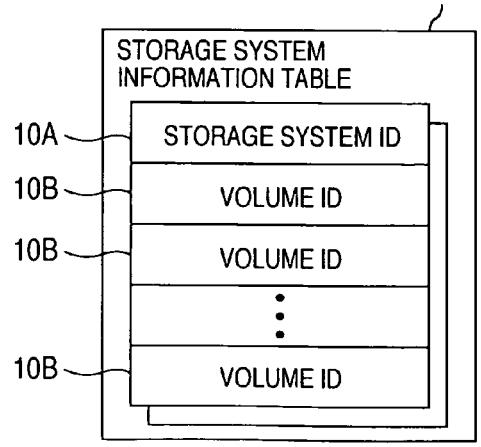
FIG. 6 shows a storage controller information table in the embodiment of the present invention.

FIG. 6 shows the storage system information table 114. The storage system information table is a table for holding information of all the storage systems to be managed by the primary management computer 100. The storage system information table 114 includes storage system ID (10A) for identifying the storage system uniquely and volume ID (10B) for identifying volume in the storage system uniquely.

The primary host computer 200 shown in FIG. 2B includes a memory 210, a processor 220 and an I/O processing unit 230, which are connected to each other through an internal network (not shown). An application program (AP) 211 and an operating system (OS) 212 are stored in the memory 210. The application program 211 and the operating system 212 are executed by the processor 220. Similarly, the secondary host computer 700 has, although not shown, the same configuration as that of the secondary host computer and an application program (AP) and an operating system (OS) are stored in a memory thereof.

FIG. 7 is a schematic diagram illustrating the primary storage system in the computer system. The primary storage system 1000a shown in FIG. 7 includes a cache part 1100a, an input/output controller 1300a, a shared memory 1200a and a disk controller 1400a, which are connected to each other through an internal network.

The cache part 1100a shown in FIG. 7 includes a data memory 1120a, a cache controller 1110a and a cache control memory 1130a, which are connected to each other through an internal network of the cache controller. The cache controller 1110a controls to temporarily store data received from the primary management computer 100 and the primary host computer 200 into a high speed data memory 1120a. The cache control memory 1130a stores cache control information 1135 (refer to FIG. 8) including address information for storage destination of the received data and status information of cache.

The cache part 1100a temporarily stores the data received by the primary storage system 1000a from the primary management computer 100 and the primary host computer 200 into the high-speed data memory. The data is stored in the data memory, so that the primary host computer 200 can make data access at far higher speed as compared with data stored in a low-speed physical storage device such as a hard disk drive.

The input/output controller 1300a includes a processor 1310a, an I/O transmitter-receiver 1320a and a memory 1330a, which are connected to each other through an internal network of an input/output part, although not shown. The I/O transmitter-receiver 1320a makes transmission and reception of storage control command and data from the primary management computer 100 and the primary host computer 200 and data between the storage systems. The memory 1330a stores control information required in processing of the processor 1310a.

The processor 1310a can read out a copying processing program 1230a for making deputy copying and an input/output processing program 1270a for making input/output processing, stored in the shared memory 1200a, to execute the programs, so that the received data is processed in accordance with a storage control command 7300 (refer to FIG. 9) from the primary management computer 100 and the primary host computer 200. The storage control command 7300 contains reading and writing of data and remote copying control of write data.

The shared memory 1200a stores control programs and control information required in the input/output controller. The stored information contains copying processing program 1230a, input/output processing program 1270a, deputy copying pair management information 1260a (refer to FIG. 11), copying pair management information 1210a (refer to FIG. 10), dirty cache information 1220a (refer to FIG. 12), write data management information 1240*a* (refer to FIG. 13) and volume management information 1250*a* (refer to FIG. 14).

The disk controller 1400*a* includes, although not shown, a processor and a memory and makes processing for providing the disk drives 1500 as logical volumes that are logical memory sources. Further, the disk controller 1400*a* makes transfer processing of read data and write data between the cache part 1100*a* and the disk drive 1500 if necessary. In addition, the disk controller has the virtualization function for providing logical volume in the primary external storage system 2000 connected externally to the primary storage system 1000*a* to the primary management computer 100 and/or the primary host computer 200 as its own logical volume.

Figure 8:
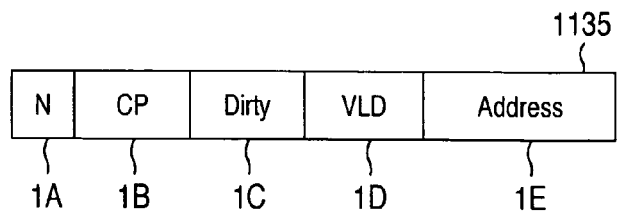
FIG. 8 shows cache control information in the embodiment of the present invention.

FIG. 8 shows the cache control information 1135.

The cache control information 1135 includes N (1A) indicating an index number, CP (1B) indicating whether data to be copied is present or not, Dirty (1C) indicating that latest data exists in only the cache part, VLD (1D) indicating the presence of data, and Address (1E) holding storage destination volume ID of data issued by the primary management computer and its logical block address.

Figure 9:
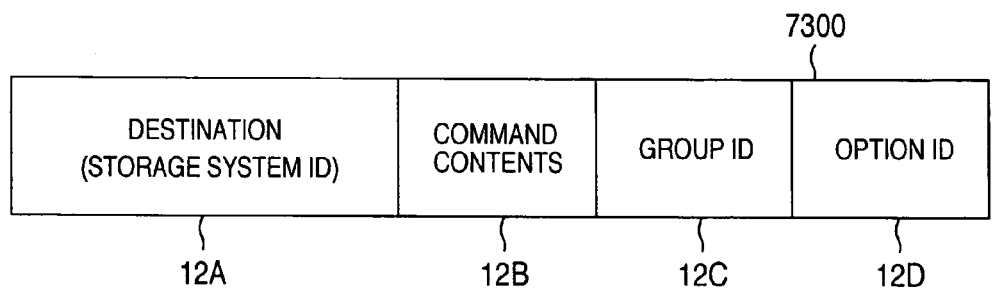
FIG. 9 shows an example of a storage control command in the embodiment of the present invention.

FIG. 9 shows an example of the storage control command 7300. The storage control command is a kind of I/O request which the primary management computer 100 and the primary host computer 200 issues to the primary storage system 1000*a* and includes destination (12A), command contents (12B), group ID (12C) and option ID (12D). An issuance destination of I/O request (ID for identifying the primary storage system 1000*a*) issued by the primary management computer 100 and the primary host computer 200 is set in the destination (12A).

Command contents for storage control are set in the command contents (12B). The command contents contain, for example, remote copying control commands (start, deputy start, temporary suspension, differential resumption, resumption, release, purge, status acquisition and the like). ID indicating copying registered in the storage system is set in the group ID. Constituent information of copying (storage system ID and volume ID of copy target and copy source and the like) and option information for assisting storage control command are set in the option ID (12D).

Figure 10:
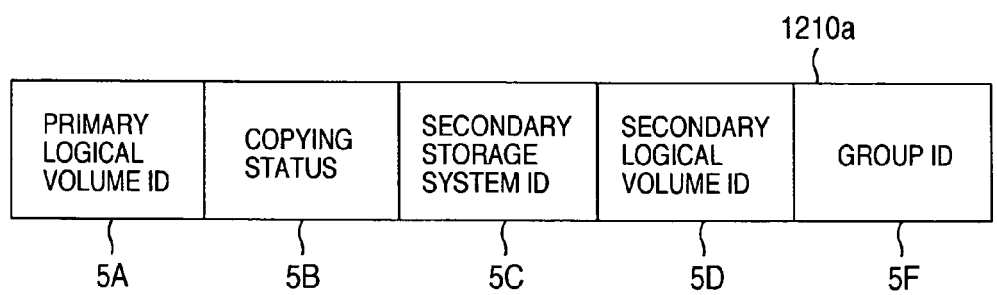
FIG. 10 is a format diagram showing copying pair management information in the embodiment of the present invention.

FIG. 10 is a format diagram showing the copying pair management information 1210*a*. The copying pair management information 1210*a* contains primary logical volume ID (5A), copying status (5B), secondary storage system ID (5C), secondary logical volume ID (5D) and group ID (5F). The primary logical volume ID (5A) is to identify logical volume of copying source in the primary storage system.

The copying status (5B) indicates processing status of copying. Contents of the status contain secondary, primary, initial copying normality, deputy and abnormality. The secondary storage system ID (5C) is to identify secondary storage system of copying transfer destination. The secondary logical volume ID (5D) is to identify logical volume of copying transfer destination in the secondary storage system. The primary group ID (5F) is to identify copying group of the primary storage system 1000*a* to which copying pair belongs.

Figure 11:
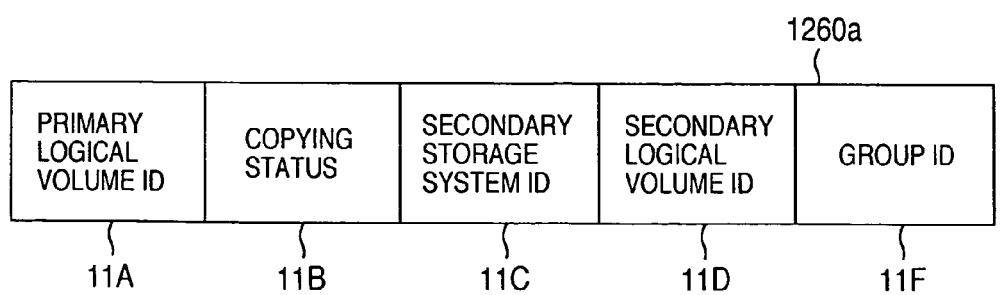
FIG. 11 shows a format example of deputy copying pair management information in the embodiment of the present invention.

FIG. 11 shows a format example of the deputy copying pair management information 1260*a*. The deputy copying pair management information has the same configuration as that of the copying pair management information 1210*a*. That is, the deputy copying pair management information contains primary logical volume ID (11A), copying status (11B), secondary storage system ID (11C), secondary logical volume ID (11D) and group ID (11F).

Figure 12:
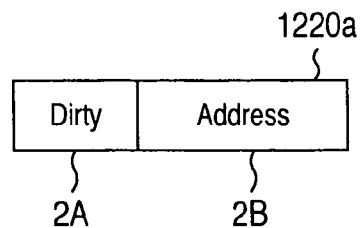
FIG. 12 shows an example of dirty cache information in the embodiment of the present invention.

FIG. 12 shows an example of the dirty cache information 1220*a*. The dirty information (Dirty (1C)) and the address information (Address (1E)) constituting parts of the cache control information 1135 (refer to FIG. 8) stored in the cache part at a certain time are set in places 2A and 2B of the dirty cache information 1220*a*, respectively.

Figure 13:
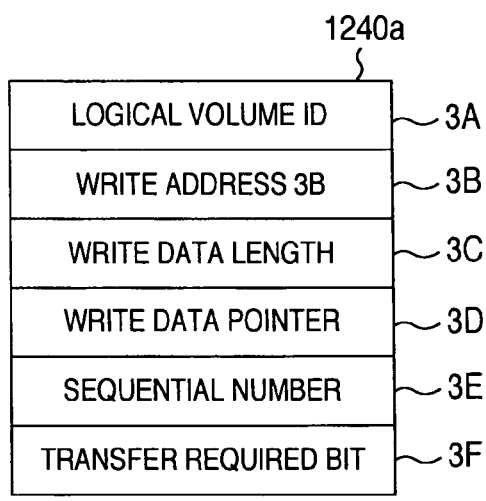
FIG. 13 shows an example of write data management information in the embodiment of the present invention.

FIG. 13 shows an example of the write data management information 1240*a*. As the write data management information 1240*a*, information referred to store a copy of data stored in logical volume of transfer destination in the secondary storage systems 3000*a*, 3000*b* into logical volume of transfer destination is stored. The write data management information 1240*a* contains logical volume ID (3A), write address (3B), write data length (3C), write data pointer (3D), sequential number (3E) and transfer required bit (3F).

The logical volume ID (3A) is to specify logical volume for write destination of the write data. The write address (3B) is a write address in logical volume for write destination of the write data. The write data length (3C) is data size of the write data. The transfer required bit (3F) shows the presence of remote copying target.

Figure 14:
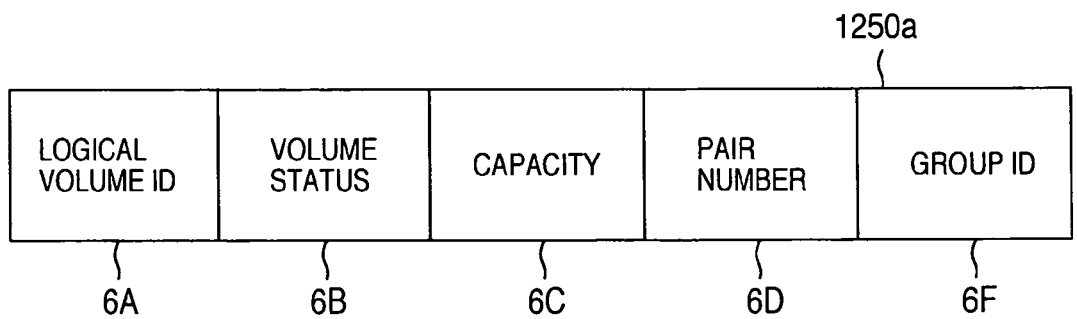
FIG. 14 is a format diagram showing volume management information in the embodiment of the present invention.

FIG. 14 is a format diagram showing the volume management information 1250*a*. The volume management information 1250*a* is management information for causing the primary storage system 1000*a* to manage the status of all the logical volumes in the primary storage system and contains logical volume ID (6A), volume status (6B), capacity (6C), pair number (6D) and group ID (6F).

The logical volume ID (6A) is to identify logical volume for copy source in the primary storage system. The volume status (6B) shows the status of logical volume and any of normal, primary, secondary, abnormal, virtual and unused is set therein. When the volume status is set to be normal or primary or virtual, it means that the primary management computer 100 or the primary host computer 200 can access to the logical volume normally. Further, when the volume status is set to be virtual, it means that the logical volume is virtual volume (described later in detail).

Further, when the volume status (6B) is primary, it means that the logical volume is that of copy source. When the volume status (6B) is secondary, it means that the logical volume is that of copying transfer destination. When the volume status (6B) is abnormal, it means that the primary management computer 100 or the primary host computer 200 cannot access to the logical volume normally.

It is caused by failure due to trouble of the disk drive 1500 having the logical volume, for example. When the volume status (6B) is unused, it means that the logical volume is not used. The pair number (6D) is to specify pair. The group ID (6F) is to specify group in the primary storage system 1000*a*.

The function that the storage system different from the external storage system virtually provides the logical volume of the external storage system as its own logical volume is named virtualization function. The logical volume provided by the virtualization function is named virtual volume. The storage system having the virtualization function and its controller are named virtual storage system. The virtualization function is provided in a virtualization device to virtualize physical devices.

Definition of virtualization is described. The virtualization is that, when processing that the virtual volume ID as shown in FIG. 3 is regarded as target is performed, the logical volume ID corresponding to the virtual volume ID is specified on the basis of the relation address (9C) and the logical volume is accessed to make reading and writing of data.

For example, when access to the virtual volume ID is received from the host computer, the virtual storage system makes access to the logical volume on the basis of the relation address and responds to access from the host computer.

Accordingly, the virtual volume is provided to the host computer virtually and it is possible to make access to the logical volume in which data is stored actually. This is the virtualization environment.

Figure 15:
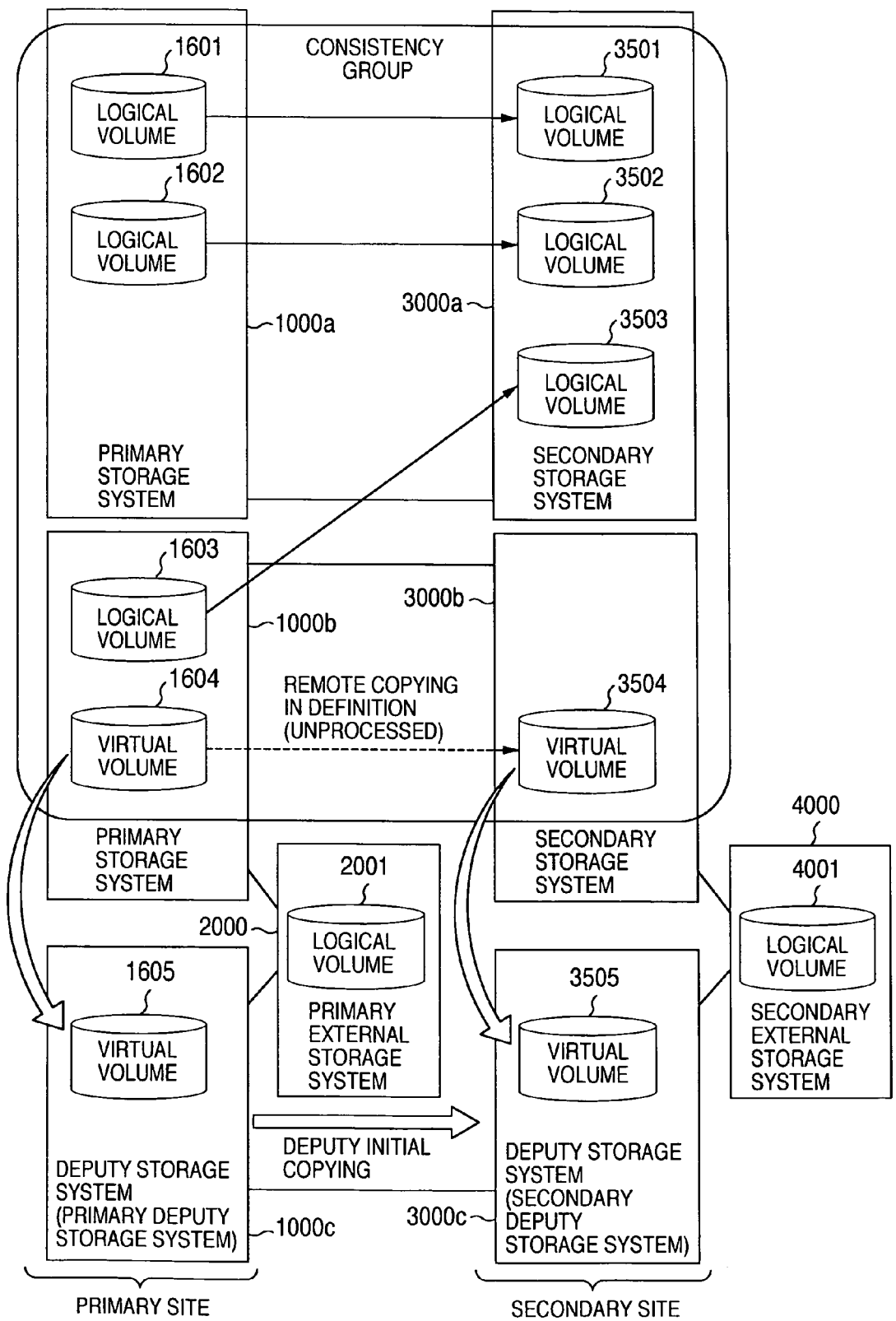
FIG. 15 is a schematic diagram illustrating initial copying operation in the embodiment of the present invention.

FIG. 15 is a schematic diagram illustrating initial copying operation. In the embodiment, the storage system which can provide the logical volume provided by the external storage system as its own logical volume virtually and the external storage system are utilized.

In FIG. 15, three storage systems (primary storage systems 1000a, 1000b and deputy storage system 1000c) are connected to three storage systems (secondary storage systems 3000a, 3000b and deputy storage system 3000c) through data communication lines. Further, two primary storage systems 1000b and 1000c are connected to the primary external storage system 2000 and provide one logical volume 2001 provided by the primary external storage system 2000 as virtual volumes 1604 and 1605, respectively.

Similarly, the secondary storage systems 3000b and 3000c are connected to the secondary external storage system 4000 and provides logical volume 4001 provided by the secondary external storage system 4000 as virtual volumes 3504 and 3505, respectively.

It is now supposed that remote copying is already performed from logical volumes 1601, 1602 and 1603 of the primary storage systems 1000a, 1000b to logical volumes 3501, 3502 and 3503 of the secondary storage system 3000a. Here, when remote copying is added, initial copying is added in the primary storage systems 1000a, 1000b. As a result, performance in data access in the primary management computer 100 and the primary host computer 200 accessing the primary storage system 1000b which is performing the remote copying is deteriorated.

Accordingly, in the embodiment, the initial copying processing to be added is to be performed in the virtual storage system different from the storage system which is already performing the remote copying. The virtual storage system is named deputy storage system in particular.

For example, when initial copying is performed between the virtual volumes 1604 and 3504 to be added, the initial copying is performed in the deputy storage systems 1000c and 3000c different from the above storage systems. In order to realize it, logical volumes (primary and secondary sites) of the external storage systems for the primary and secondary sites are shared with the deputy storage systems (1000c, 3000c) and the virtual storage systems for primary and secondary sites to be provided as virtual volumes (virtual volume 1605 for primary site and virtual volume 3505 for secondary site).

Further, the initial copying is performed between the virtual volumes (primary and secondary sites) of the deputy storage systems for primary and secondary sites. After completion of the initial copying, since the system is set under the consistency control, the regular copying is performed between the virtual volumes (primary and secondary sites) of the virtual storage systems for primary and secondary sites designated originally.

In the embodiment, the initial copying is described primarily, while it is applicable to the procedure for shifting from the temporary suspension status to the regular status (re-synchronization processing). The reason is that the copying processing is not set under the consistency control during the shifting procedure similarly to the initial copying. Both of the initial copying and the copying processing are different from each other in that the contents of the storage control command are changed from starting command to re-synchronization command.

FIG. 16 is a flow chart showing the setting procedure. The setting procedure is performed by the primary management computer 100 and the secondary management computer 600. Here, the procedure of the primary management computer 100 is described but the procedure of the secondary storage system 600 is the same.

The primary management computer 100 acquires information of the storage systems provided in the computer system on the basis of a command of the user using the system of the embodiment, such as a storage manager (step S5000). The acquirement of information is made when the processor 120 of the primary management computer 100 issues the storage control command 7300 through the data communication line 500 or control communication line not shown in accordance with a command of the storage management program 112.

The control communication lines are the communication path connected to the primary management computer 100, the primary host computer 200, the secondary management computer 600, the secondary host computer 700, the primary storage systems 1000a, 100b, the secondary storage systems 3000a, 3000b, the primary external storage system 2000 and the secondary external storage system 4000 to control these apparatuses. After the information of the storage systems is acquired in step S5000, the processor 120 prepares the storage system information table 114. The storage system ID (10A) and the volume ID (10B) are registered in the storage system information table 114 and after the registration the processor 120 stores the IDs into the memories 110 of the same primary management computer 100 and the secondary management computer 600.

The primary management computer 100 defines the relation of the virtual storage system and the primary external storage system on the basis of the user's command (step S5010). The primary management computer 100 defines the logical volume to be controlled in the embodiment as logical volumes of the primary external storage system 2000 and the secondary external storage system 4000 on the basis of the user's command. Then, virtual volumes in the primary storage systems 1000a, 1000b and the secondary storage systems 3000a, 3000b for virtualizing the logical volume in the external storage system are defined.

As the processing in step S5010, finally, the relation as to which logical volume of the external storage system is assigned to which virtual volume of the virtual storage system is defined. The relation is registered as the virtual external relation information 111 (refer to FIG. 3). The virtual volume and the logical volume related to each other indicate the position having both of the volume information in the relation addresses (9C, 9F) of the virtual external relation information (information expressing one volume with one element in the virtual external relation information, that is, top address of the area set by defining 9A to 9C and 9D to 9F as one element).

The primary management computer 100 prepares (performs) copying definition on the basis of the user's command (step S5030). When the primary management computer 100 completes designation of copying information (7A), primary storage system ID (7B), secondary storage system ID (7D), volume ID (7C) of the primary storage system and volume ID (7E) of the secondary storage system for the copying definition table 113 (refer to FIG. 4), the processor 120 prepares the copying definition table 113. The processor 120 refers to user's input information to the primary management computer 100 and the storage system information table 114 stored in the memory 110 to thereby prepare the copying definition table 113.

The deputy storage table 115 (refer to FIG. 17) is prepared with reference to the copying definition table 113 prepared by the processor 120 and the virtual external relation information 111 (step S5040). The deputy storage table 115 represents that the logical volume contained in the copying definition table 113 can make deputy initial copying with which virtual volume of which deputy storage system.

FIG. 17 shows an example of the deputy storage table 115.

The deputy storage table 115 is formed into a matrix format and has the rows in which information of the storage systems described in the copying definition table 113 (described in FIG. 17 as the definition storage system having storage system ID and virtual volume ID) is entered and the columns in which information of the deputy storage systems (described as the virtual storage system available as the deputy storage system having storage system ID and virtual volume ID) is entered.

Further, invalidity flag indicating invalidity as deputy storage system, the number of virtual volumes in copying-defined storage system (described as definition total), the total number of virtual volumes in deputy storage system (described as deputy total), part indicating the number of virtual volumes assigned to deputy storage system (described as number of deputy storage assigned virtual volumes), part indicating whether copying-defined volume is assigned to virtual volume of deputy storage system or not (described as assigned), performance part indicating performance of deputy storage system (described as performance (cache occupancy rate)) and part indicating difference between current and past values of acquired performance part (described as performance difference) are described in the deputy storage table 115.

In the deputy storage table 115, a mark ("1" in FIG. 17) is described in the virtual volume of the deputy storage system sharing the virtual volume of the same external storage system as that of the copying-defined virtual volume. For example, the row (record) for the virtual volume ID="2" of the copying-defined storage system ID="2" can utilize the column (field) for deputy storage system ID="2" and virtual volume ID="2" as the deputy storage system.

The processor 120 starts monitoring of the performance information of the deputy storage system on the basis of the deputy storage table 115. The processor 120 acquires the cache occupancy rate from one or more deputy storage systems registered in the deputy storage table 115 periodically.

The acquired result is compared with the performance information acquired the last time in the deputy storage table 115 to obtain difference therebetween and it is stored in the deputy storage table 115 as the performance difference. The primary management computer 100 monitors the performance continuously until the initial copying is started on the basis of the user's command. However, when there are a plurality of copying definitions, the monitoring of the performance is continued until all of the copying operations are started.

FIG. 18 is a flow chart showing a processing procedure made from time that copying is started by the primary management computer 100 to time that it is shifted to the regular copying. The processing procedure is started just after the primary management computer 100 issues the deputy copying start command on the basis of the user's command.

The processor 120 of the primary management computer 100 decides the deputy storage system on the basis of the performance information in the deputy storage table (step S5500). The decision algorithm of the deputy storage system is described later. The decision algorithm is performed to decide the storage system ID and the logical volume ID of the deputy storage system.

The processor 120 prepares the copying definition table (deputy copying definition table 116 (refer to FIG. 5)) reflecting the deputy storage system decided in step S5500 (step S5510).

The processor 120 issues the storage control command (deputy copying start command) to the primary storage system 1000*a*, using the copying definition table 113 (step S5520).

The processor 120 issues the storage control command (start command) to the deputy storage system 1000*c*, using the deputy copying definition table 116 (step S5530).

The processor 120 issues the storage control command (status acquisition) to the primary storage systems 1000*a*, 1000*b*, 3000*a* and 3000*b*, using the deputy copying definition table 116 and acquires the status of remote copying. The operation in step S5540 is repeated until the status of remote copying reaches the right status meaning the completion of the initial copying (step S5540).

The processor 120 issues the storage control command (release) to the primary storage systems 1000*a*, 1000*b*, using the deputy storage table 115. The deputy copying is ended with this operation (step S5550).

The processor 120 issues the storage control command (differential resumption) to the primary storage systems 1000*a*, 1000*b*, using the copying definition table 113 (step S5560). The differential resumption command is a command that the primary storage systems 1000*a*, 1000*b* of copy target remote-copies the write data received from the primary management computer 100 or the primary host computer 200 into the secondary storage systems 3000*a*, 3000*b* during the initial copying and starts the regular copying after completion thereof.

FIG. 19 is a flow chart showing decision algorithm of the deputy storage system.

When there are a plurality of candidates for deputy storage systems, the decision algorithm of the deputy storage system is used. The decision algorithm of the deputy storage system can be used to assign the initial copying to the deputy storage systems having a light load uniformly.

The processor 120 of the primary management computer 100 refers to the performance and the differential performance of the deputy storage system 115 to detect the deputy storage system having a heavy load, so that the deputy storage system is removed from the candidate in accordance with the degree of load or the number of remote copying to be operated in the deputy storage system is reduced. That is, the candidate for deputy storage systems is selected on the basis of the performance information (step S5600). The method of narrowing down the deputy storage systems on the basis of the performance information is described later.

The processor 120 detects the row of the deputy storage table 115 having the part of assigned that is not 1 and the definition total that is minimum (step S5610). However, when there are a plurality of rows having minimum definition total, any one of rows is selected.

The processor 120 detects a row element having minimum deputy total among the row elements in the deputy storage table 115 detected in step S5610 (step S5620).

In step S5620, when there are a plurality of row elements having minimum definition total in the deputy storage table (Yes of step S5630), the processor 120 selects the row element having the number of deputy storage assigned virtual volumes that is minimum (step S5670).

In steps S5620 and S5630, the deputy storage system and its virtual volume are specified. That is, the remote copying performed with the storage system ID and the virtual volume ID indicated by the selected row (definition storage system)

of the deputy storage table 115 is performed by the deputy storage system (virtual volume ID of storage system ID) shown by the column (virtual storage system available as deputy storage system) of the deputy storage table 115 by deputy. At this time, 1 is added to the number of pertinent deputy storage assigned virtual volumes of the deputy storage table. Further, 1 is written into the assigned part of the pertinent row in order to show that it is assigned (step S5640).

The processor 120 writes the column element (virtual volume ID of storage system ID of deputy storage system) decided in step S5640 of the deputy storage table into the deputy copying definition table 116 (step S5650). The writing position in the deputy copying definition table is the part corresponding to the storage system ID and the logical volume ID registered in the copying definition table 113 (storage system ID and logical volume ID coincident with the decided column element of the deputy storage table) and the storage ID and the logical volume ID of the deputy storage system are registered therein.

When there is an element of 0 in the assigned part of the deputy storage table, the above processing is repeated from the step S5610 (step S5660).

Since the load imposed on the storage system by the initial copying as described above is very heavy, it is desired that the deputy storage system which performs the initial copying by deputy is in the light load status. Accordingly, the primary management computer 100 acquires the performance information of the storage systems periodically, so that the primary management computer 100 is prevented from selecting the storage system having a heavy load in the beginning of the initial copying as deputy copying.

Figure 20:
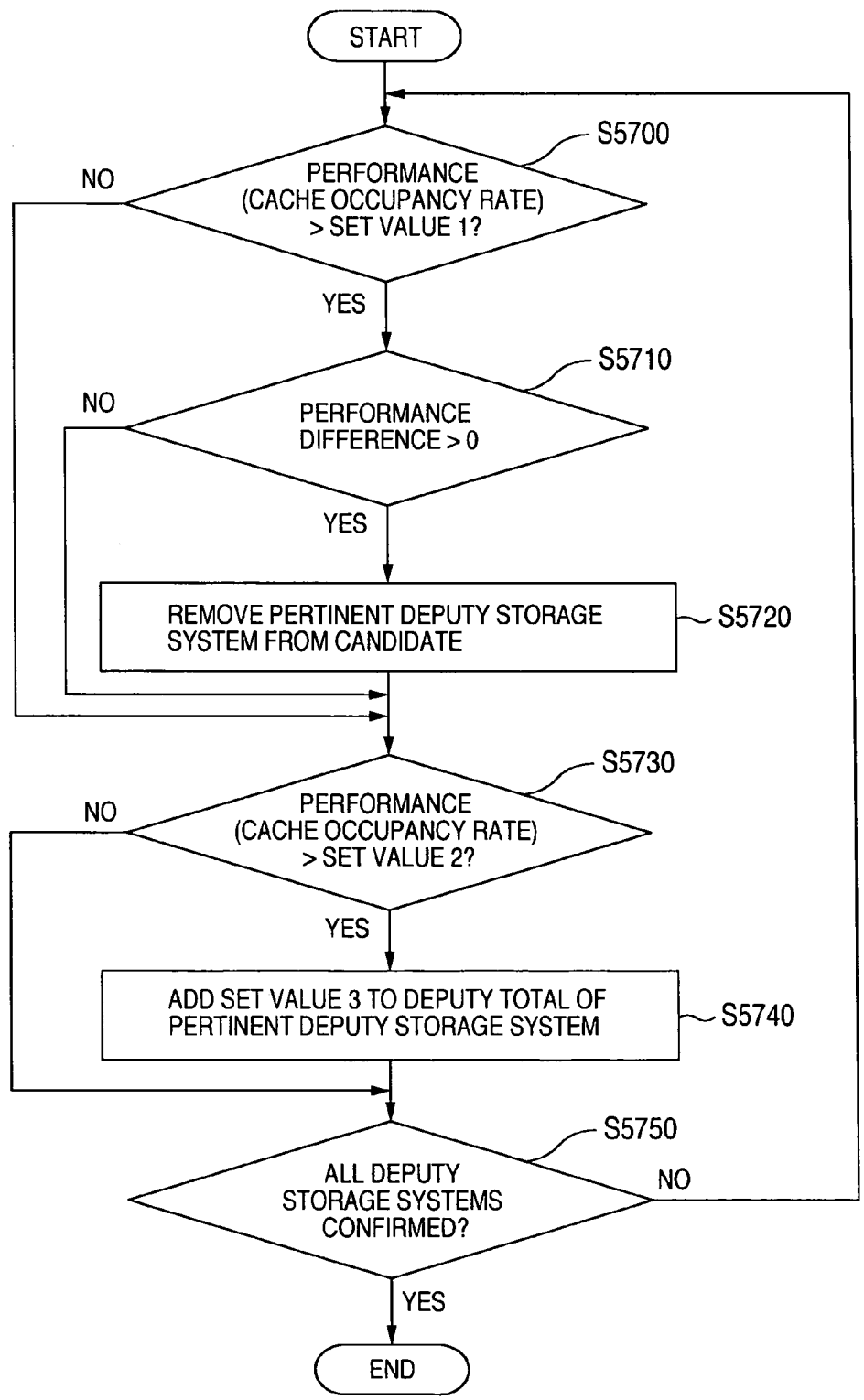
FIG. 20 is a flowchart showing a processing procedure for narrowing down candidates for deputy storage systems on the basis of performance information in the embodiment of the present invention.

FIG. 20 is a flow chart showing processing procedure of narrowing down candidates for deputy storage systems on the basis of the performance information.

First, the processor 120 of the primary management computer 100 refers to the value described in the performance part (cache occupancy rate) of the column having the invalidity flag of 0 in the deputy storage table 115 from the left. Then, it is confirmed whether the referred value exceeds a predetermined set value 1 or not (step S5700). The value by which it is regarded that the deputy copying cannot be performed due to a heavy load is set as the set value 1.

When the referred value in the performance part does not exceed the set value 1 (Yes of step S5700), it is confirmed whether the pertinent value in the performance difference part of the deputy storage table exceeds 0 or not. When the pertinent value in the performance difference part exceeds 0, the invalidity flag in the deputy storage table is set to 1 in order to remove the pertinent storage system and the storage system having the same storage system ID as the pertinent storage system from the candidates for the deputy storage system (step S5720).

On the other hand, when it is judged as No in steps S5700 and S5710, the processor 120 further confirms whether the value in the performance part exceeds a predetermined set value 2 or not. When it exceeds the set value 2 (Yes of step S5730), it is regarded that the pertinent deputy storage system is in the relatively heavy load status and a predetermined set value 3 is added to the deputy total in the same column as the deputy storage system ID in the pertinent column (step S5740). The processing in step S5740 can reduce the possibility that the deputy storage is assigned as the deputy copy target in the decision algorithm of the deputy storage system.

The above processing is performed for all of the columns in the deputy storage table (step S5750).

The processing procedure of the initial copying performed by the virtual storage system and the deputy storage system is now described. In this description, it is supposed that the storage systems secondaryjected to copying definition are the primary storage system 1000a and the secondary storage system 3000a and the deputy storage systems are the primary storage system 1000b and the secondary storage system 3000b.

In step S5700, the processor 120 refers to the cache occupancy rate, although the processor 120 may refer to the number of initial copying that is held as one of the performance information and has been already made by the storage system and narrow down the candidates to regard the storage systems having the number of initial copying being small as the deputy storage system. The performance information indicates the operation status of the storage systems.

Figure 21:
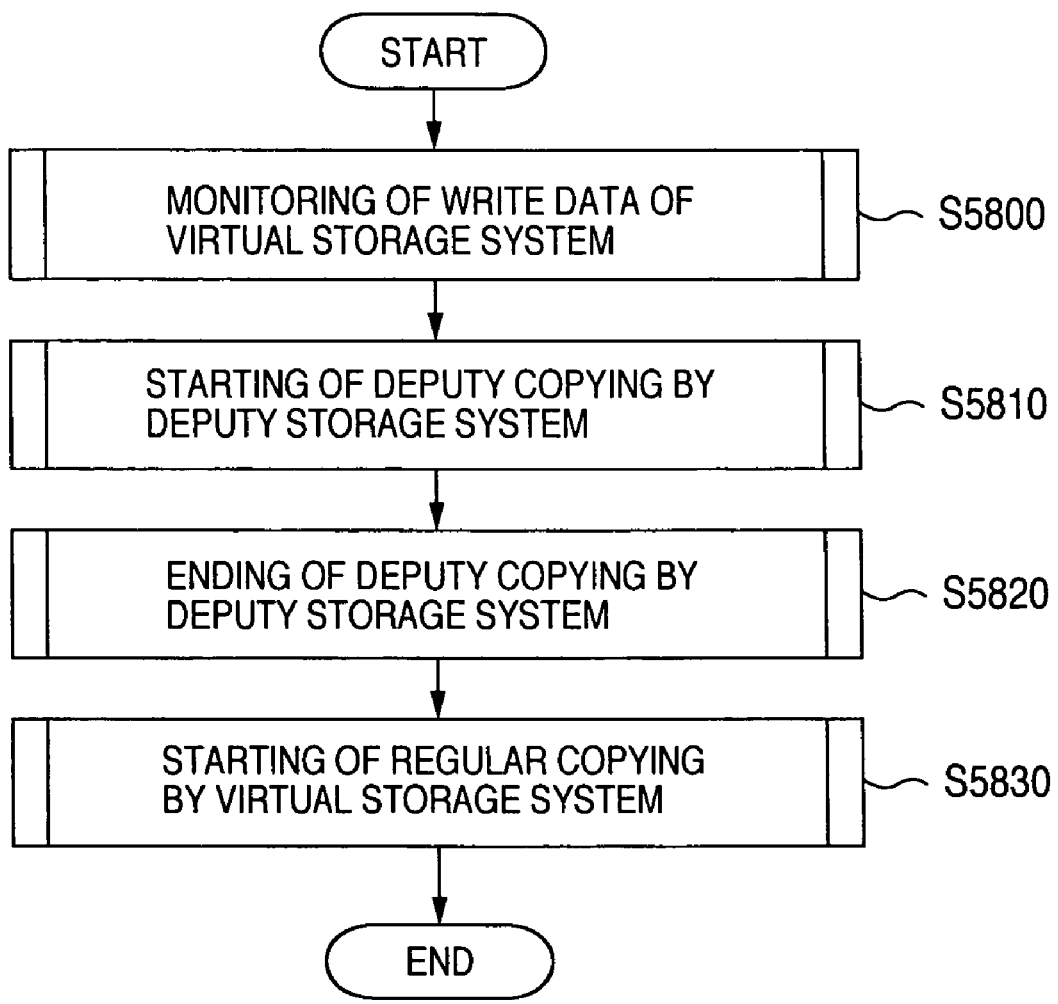
FIG. 21 is a flow chart showing a deputy copying procedure of the storage system in the embodiment of the present invention.

FIG. 21 is a flow chart showing a deputy copying procedure of the storage system.

The deputy copying procedure includes monitoring of write data of the virtual storage system (S5800), starting of deputy copying by the deputy storage system (S5810), ending of deputy copying by the deputy storage system (S5820) and starting of regular copying by the virtual storage system (S5830). These processing procedures are now described.

Figure 22:
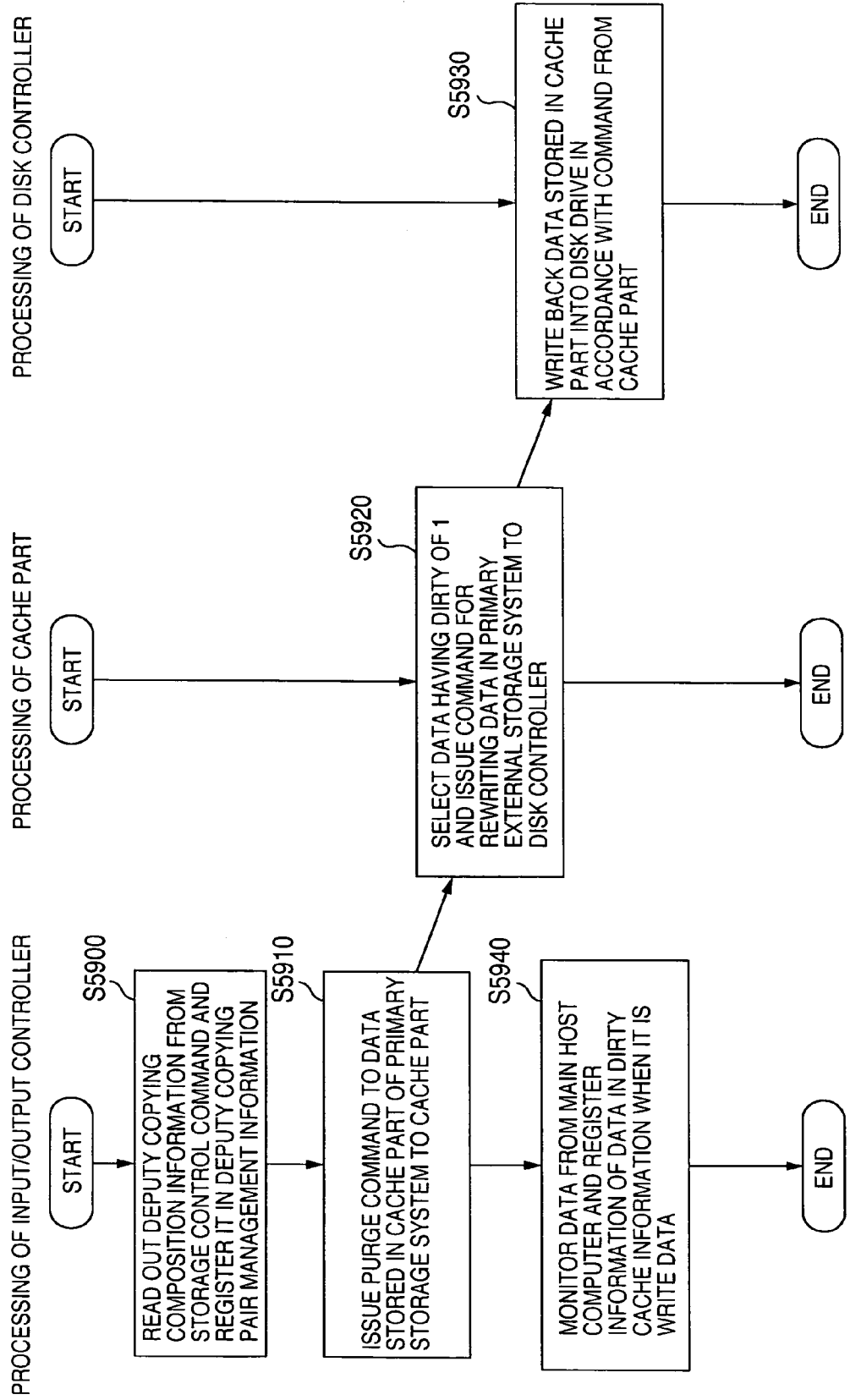
FIG. 22 is a flow chart showing a write data monitoring procedure of the storage system in the embodiment of the present invention.

FIG. 22 is a flow chart showing the monitoring procedure of write data in the storage system (step S5800 of FIG. 21).

When the primary storage system 1000a receives the storage control command 7300 (refer to FIG. 9) (command contents are deputy start) for instructing deputy copying start from the primary management computer 100, the processor 1310a of the input/output controller 1300a reads out the copying processing program 1230a from the shared memory 1200a and executes a procedure for making it possible to make deputy copying from the deputy storage system 1000c different from the primary storage system itself.

The processor 1310a first takes out the deputy copying composition information stored in the option ID column (12D) of the storage control command 7300. The deputy copying composition information contains primary storage system ID, logical volume ID of copy source, secondary storage system ID and logical volume ID of copy target. The deputy copying composition information is registered in the deputy copying pair management information 1260a (refer to FIG. 11) by the processor 1310a (step S5900). Further, the processor 1310a changes the contents of the copying status (5B) of the copying pair management information 1210a to the deputy status.

The processor 1310a issues to the cache part 1100a the command (named cache purge command) for reflecting to the primary external storage system 2000 the data stored in the cache part 1100a of data to the logical volume of the system itself registered in the deputy copying pair management information. That is, the processor issues to the cache part 1100a the purge command to the data stored in the cache part 1100a of the primary storage system (step S5910).

The cache controller 1110a of the cache part 1100a selects data having the Address part (1E) in which the same volume ID as the logical volume ID indicated in the cache processing part is registered and the Dirty (1C) (refer to FIG. 8) of 1 in response to the cache purge command from the processor 1310a and issues the command for writing back the pertinent data into the primary external storage system 2000 to the disk controller 1400a (step S5920). The cache controller 1110a sets the value of the Dirty (1C) to 0 after issuing of the command.

The disk controller 1400a performs the processing for writing back data stored in the cache part 1100a into the disk drive 1500 in accordance with the command from the cache part 1100a (step S5930).

The processor 1310a of the input/output controller 1300a monitors data from the primary management computer 100 and the primary host computer 200 to the logical volume of the system itself registered in the deputy copying pair management information 1260a and, when the data is the write data, registers the write destination address and the logical volume ID of the data into the dirty cache information 1220a (refer to FIG. 12) (step S5940). The write data is secondaryjected to the ordinary writing procedure. The monitoring of data is performed hereafter until a command is received from the primary management computer 100.

Figure 23:
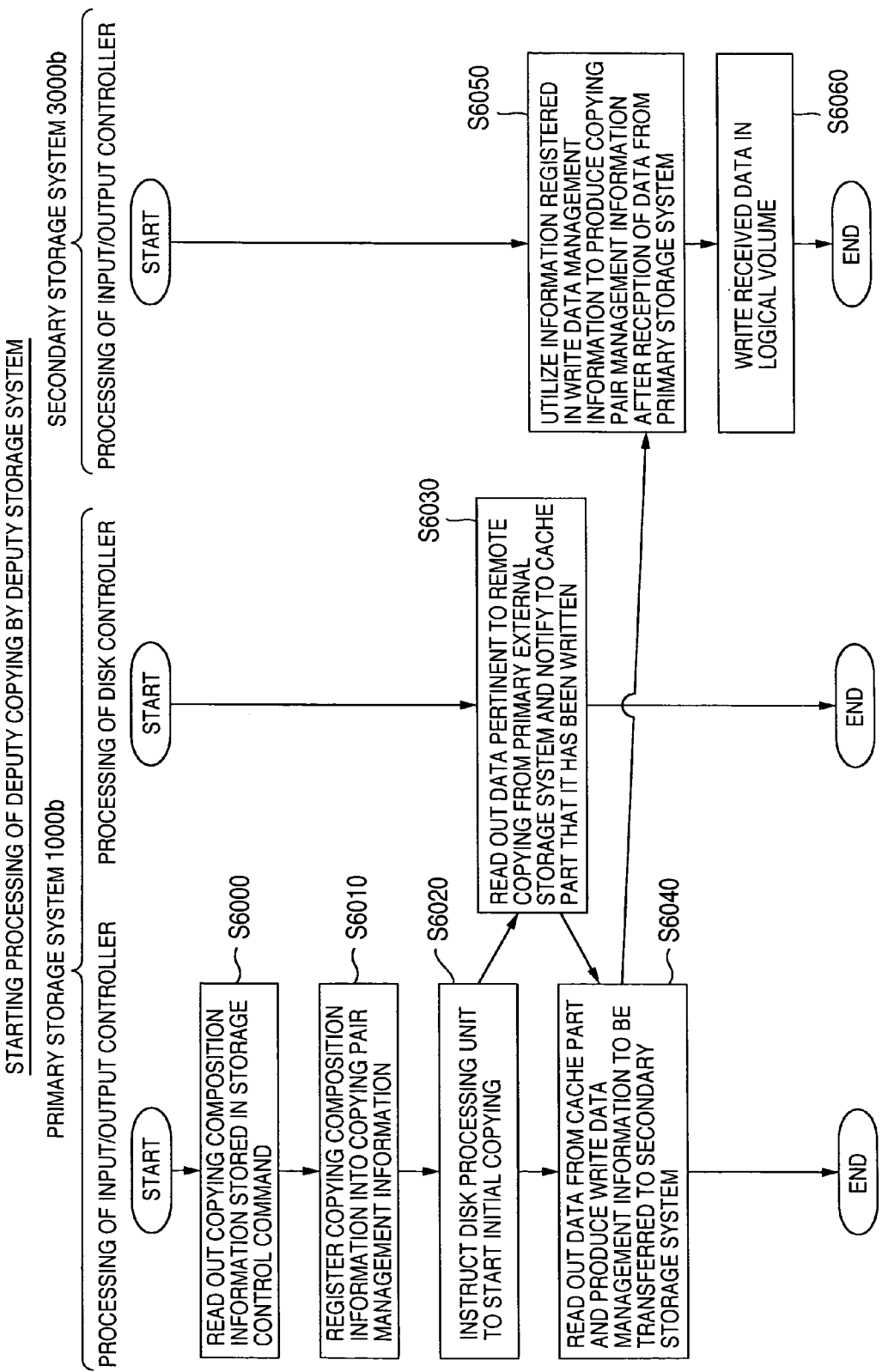
FIG. 23 is a flow chart showing a starting procedure of deputy copying by the deputy storage system in the embodiment of the present invention.

FIG. 23 is a flow chart showing the starting procedure (step S5810 of FIG. 21) of deputy copying performed by the deputy storage system 1000c.

When the primary storage system 1000b receives the storage control command 7300 (refer to FIG. 9) (command contents are start) for instructing start of deputy copying from the primary management computer 100, the processor 1310a in the input/output controller 1300a of the primary storage system 1000b reads out the copying processing program 1230a of the primary storage system 1000b from the shared memory 1200a of the primary storage system 1000b and performs deputy copying.

The processor 1310a of the primary storage system 1000b takes out the copying composition information stored in the option ID (12D) of the storage control command 7300 (refer to FIG. 9) (step S6000). The copying composition information contains primary storage system ID, logical volume ID of copy source, secondary storage system ID and logical volume ID of copy target. The processor 1310a of the primary storage system 1000b registers the copying composition information into the deputy copying pair management information 1260a (refer to FIG. 7) of the primary storage system 1000b (step S6010). Further, the processor 1310a of the primary storage system 1000b changes the contents of the copying status (5B) of the copying pair management information 1210a of the primary storage system 1000b to the status of initial copying being right.

The processor 1310a of the primary storage system 1000b instructs the disk controller 1400a of the primary storage system 1000b to start the initial copying (step S6020). The disk controller 1400a of the primary storage system 1000b reads out the data pertinent to the remote copying from the primary external storage system 2000 in accordance with the instruction and writes it into the cache part 1100a of the primary storage system 1000b. The disk controller notifies to the processor 1310a of the primary storage system 1000b that a part of the data has been written (step S6030).

The processor 1310a of the primary storage system 1000b reads out the data from the cache part 1100a of the primary storage system 1000b and produces the write data management information 1240a of the primary storage system 1000b to be transferred to the secondary storage system 3000b (step S6040). The secondary storage system 3000b utilizes information registered in the write data management information to produce the copying pair management information 1210a of the primary storage system 1000b after reception of data from the primary storage system 1000b (step S6050) and writes the data in the logical volume (step S6060). The copying status of the copying pair management information becomes secondary status.

By repeating the above operation, the contents of all the logical volumes of copy source of the copying composition information described in the storage control command are copied into the logical volume of copy target between the primary storage system 1000b and the secondary storage system 3000b.

Figure 24:
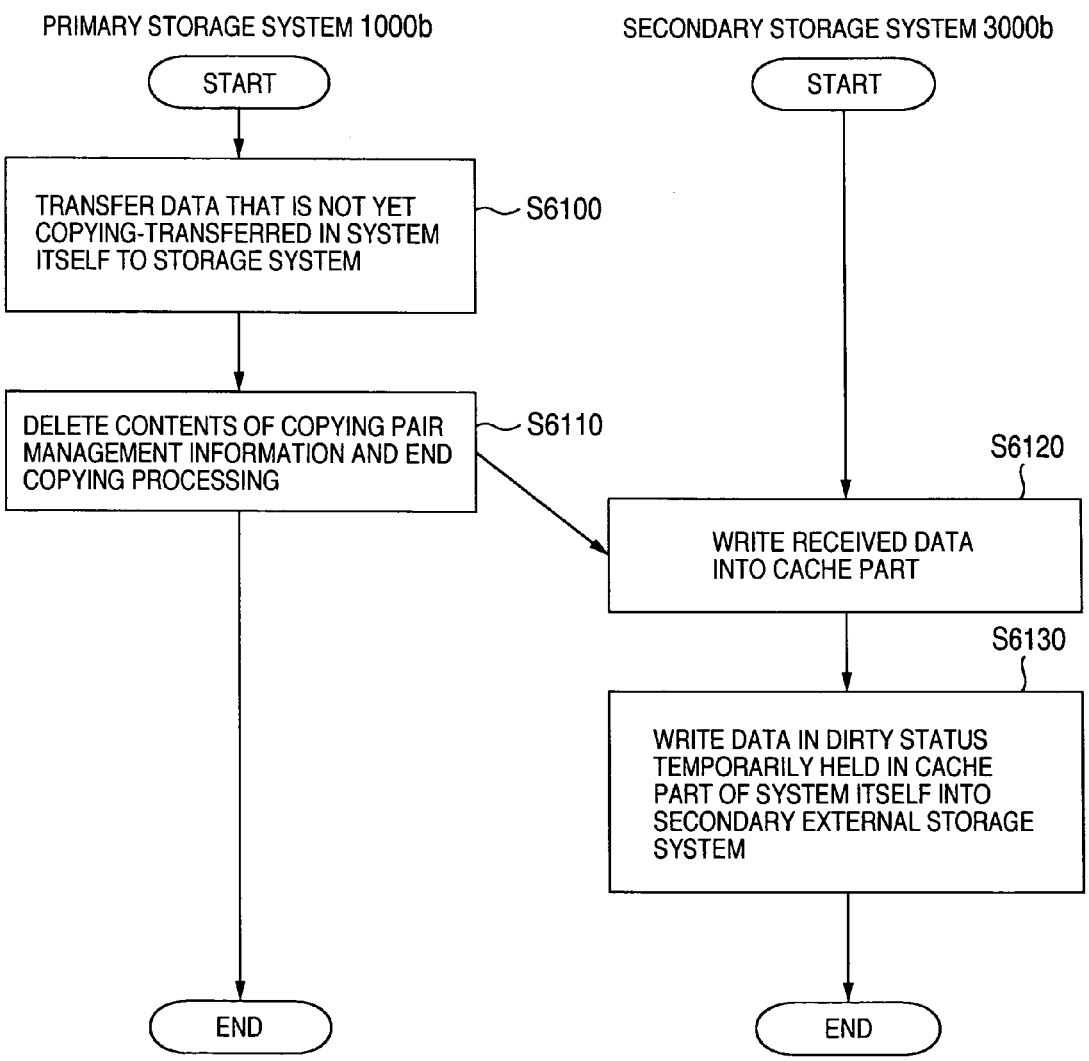
FIG. 24 is a flow chart showing an ending procedure of deputy copying by the deputy storage system in the embodiment of the present invention.

FIG. 24 is a flow chart showing the ending procedure (step S5820 of FIG. 21) of deputy copying by the deputy storage system.

When the primary storage system 1000b receives the storage control command 7300 (command contents are release) issued by the primary management computer 100, the primary storage system performs the ending procedure of the deputy copying. The processor 1310a of the primary storage system 1000b transfers the data that is not yet copying-transferred in the system itself to the secondary storage system 3000b (step S6100). After completion of transfer, the processor 1310a of the primary storage system 1000b deletes the contents of the copying pair management information 1210a of the primary storage system 1000b and ends the copying processing (step S6110). The secondary storage system 3000b writes the received data into the cache part 3100b (step S6120) and writes the data in the Dirty status temporarily held in the cache part 3100b of the system itself into the secondary external storage system 4000 (step S6130).

Figure 25:
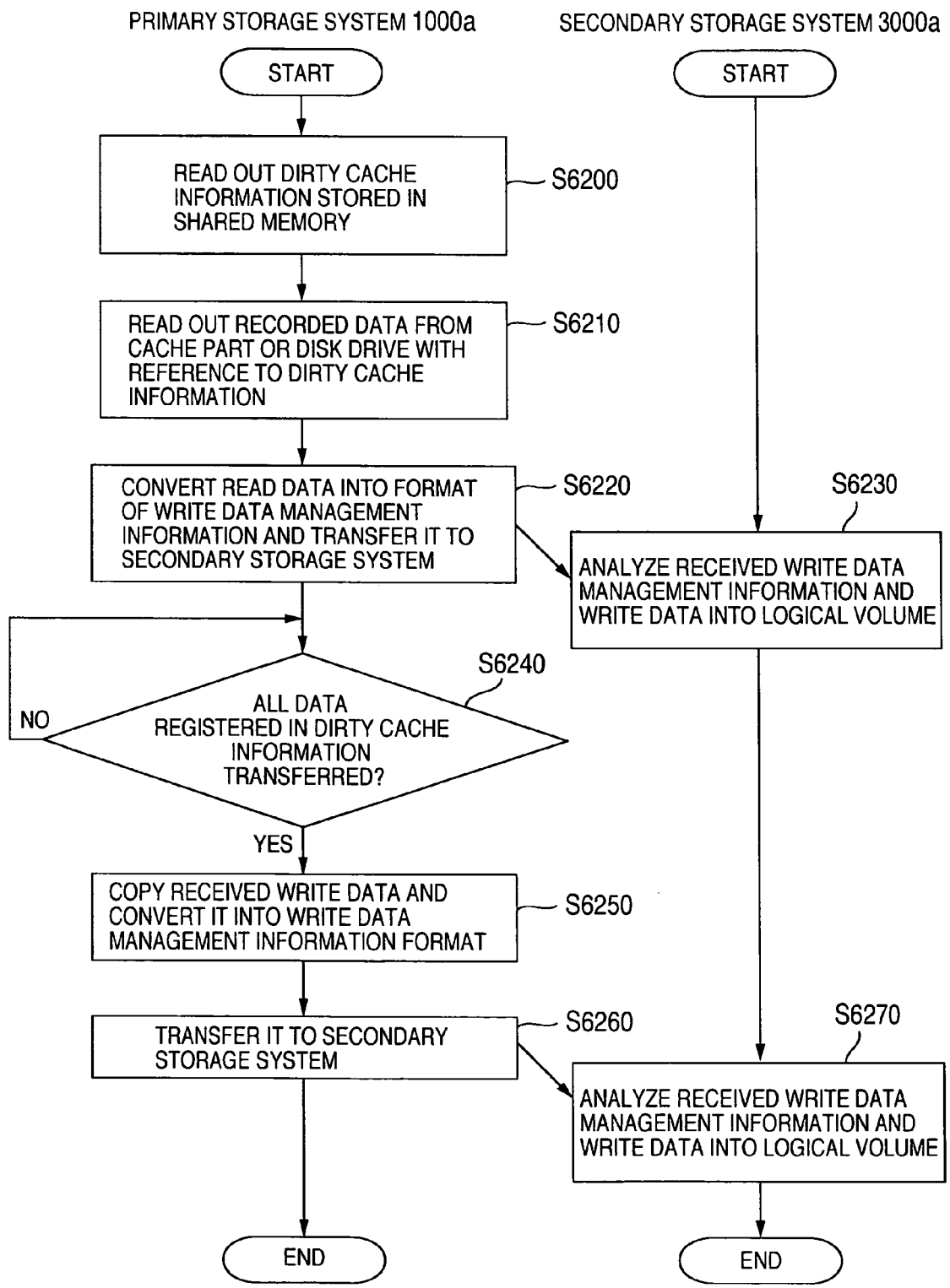
FIG. 25 is a flow chart showing a starting procedure of regular copying by the storage system in the embodiment of the present invention.

FIG. 25 is a flow chart showing the starting procedure (step S5830 of FIG. 21) of regular copying by the storage system.

When the primary storage system 1000a receives the storage control command 7300 (command contents are differential resumption) issued by the primary management computer 100, the primary storage system 1000a starts the processing for transferring data from the primary host computer 200 and the primary management computer 100 received by the virtual storage system during the deputy copying to the primary storage system 1000b.

First, the processor 1310a reads out the dirty cache information 1220a stored in the shared memory 1200a (step S6200).

The processor 1310a then reads out the recorded data from the cache part or the disk drive with reference to the dirty cache information 1220a (step S6210). The processor 1310a converts the read data into the format of the write data management information 1240a (refer to FIG. 13) and transfers it to the secondary storage system 3000a (step S6220).

The secondary storage system 3000a analyzes the received write data management information 1240a and writes data into the logical volume (step S6230).

When the processor 1310a of the primary storage system 1000a completes transferring of all the data registered in the dirty cache information 1220a (step S6240), the processor starts the regular copying. The regular copying is to transfer data issued by the primary management computer 100 or the primary host computer 200 to the primary storage system 1000a to the secondary storage system 3000a in data unit.

First, the processor 1310a of the primary storage system 1000a copies the received write data and converts it into the format of the write data management information 1240a (step S6250) to be transferred to the secondary storage system 3000a (step S6260). The secondary storage system 3000a analyzes the received write data management information 1240a and writes the data into the logical volume (step S6270).

A second embodiment of the present invention is now described.

In the first embodiment, the data from the primary host computer 200 which is performing the deputy copying is received by the virtual storage system. In the second embodiment, the deputy storage system receives the data from the primary host computer 200. Only difference between the first and second embodiments is now described. In the second embodiment, the configuration of the computer system and operation of the primary management computer 100, the primary host computer 200 and the storage system which are performing the deputy copying are different.

In the configuration of the computer system, the primary management computer 100, the secondary management computer 600, the primary host computer 200 and the secondary host computer 700 are different. More particularly, path switching programs 117 and 213 are added to the primary management computer 100, the secondary management computer 600, the primary host computer 200 and the secondary host computer 700. The path includes a communication path for connecting the primary host computer 200 and the primary storage systems 1000a, 1000b and a communication path for connecting the secondary host computer 700 and the secondary storage system 3000a, 3000b. The path switching means that the storage system to which the host computer is connected is changed.

Figure 26:
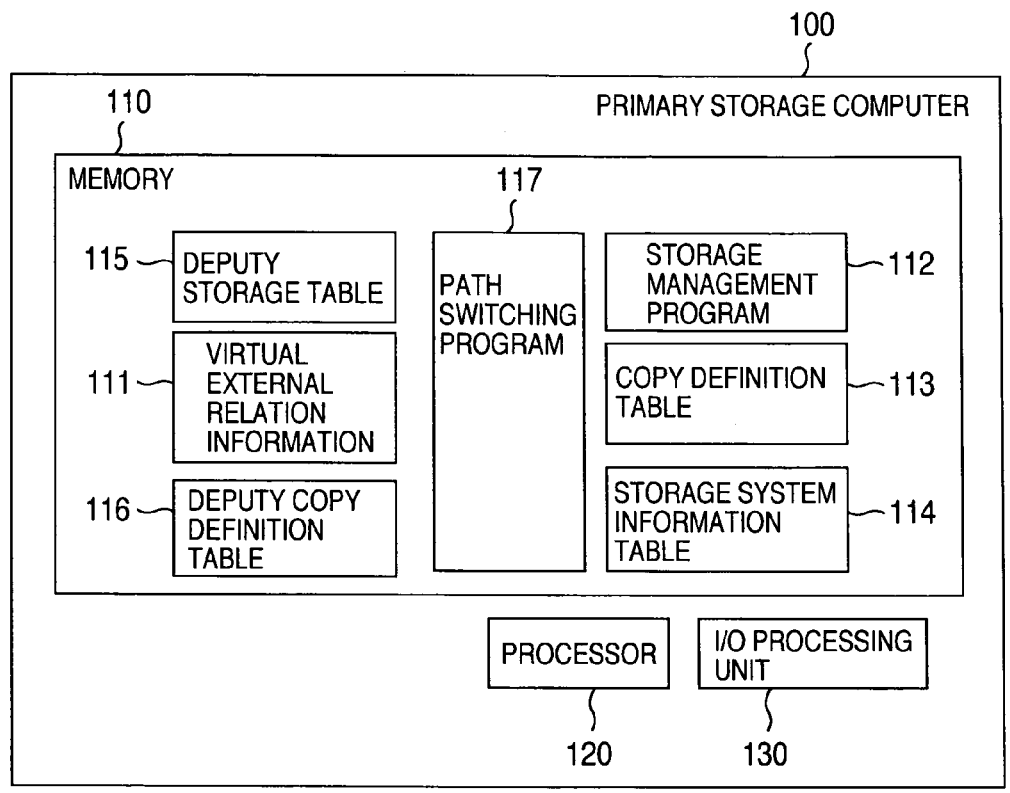
FIG. 26 is a schematic diagram illustrating a primary/secondary management computer in the embodiment of the present invention.

FIG. 26 is a schematic diagram illustrating the primary management computer 100 and the secondary management computer 600. Compared with the first embodiment, the path switching program 117 is added.

Figure 27:
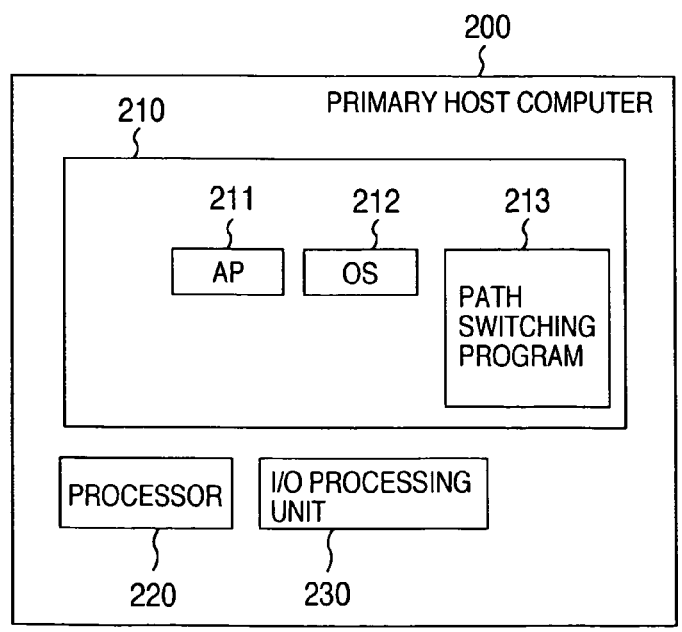
FIG. 27 is a schematic diagram illustrating a primary/secondary host computer in the embodiment of the present invention.

FIG. 27 is a schematic diagram illustrating the primary host computer 200 and the secondary host computer 700. Compared with the first embodiment, the path switching program 213 is added.

The path switching programs 117 and 213 are programs for making it possible to make data access from the primary management computer 100 and the primary host computer 200 to a storage system through the plural data communication line 500 connected to the primary host computer 200. By using the path switching program, data access from the host computer to the storage system can be made effectively.

Figure 28:
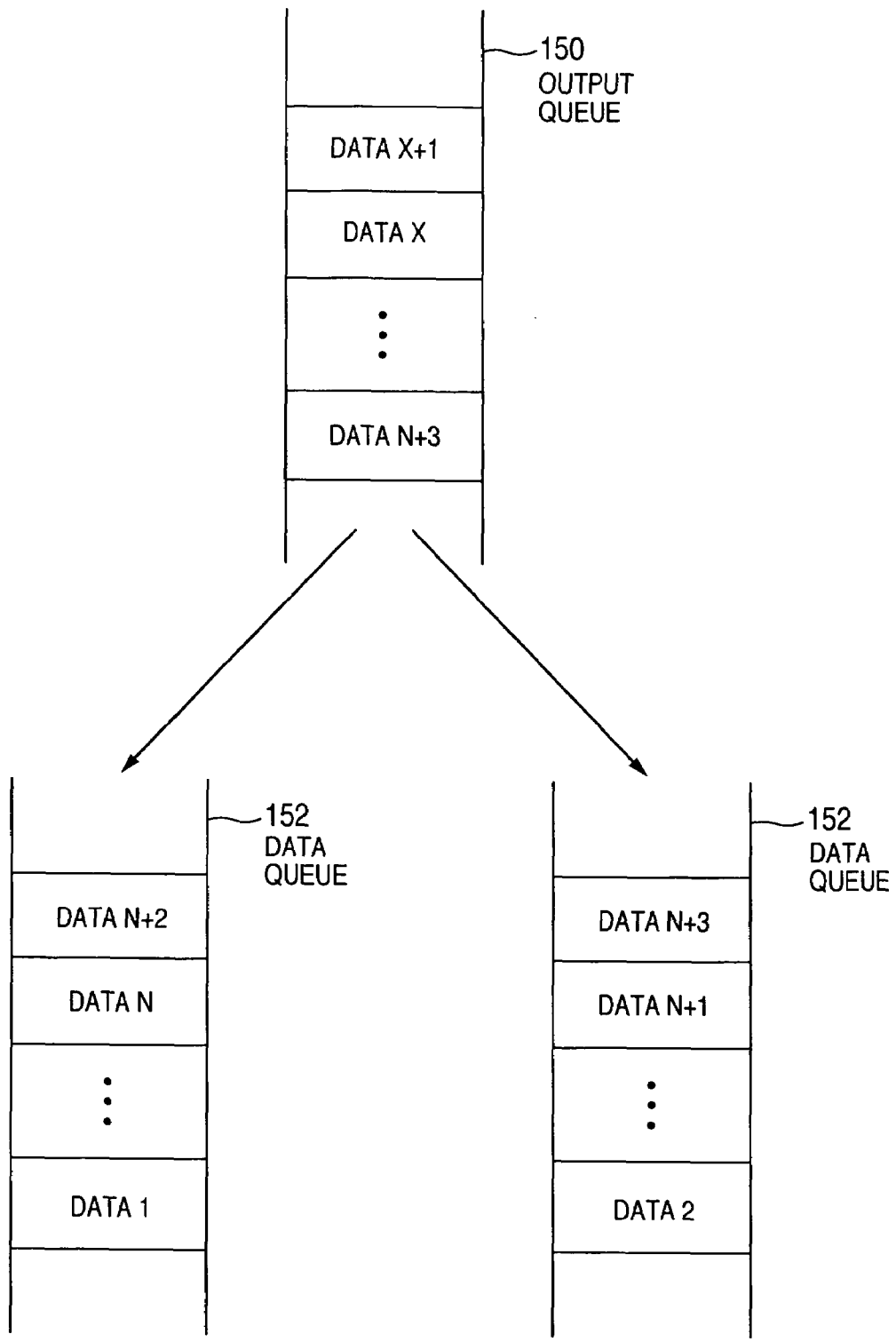
FIG. 28 is a diagram explaining operation of a path switching program in the primary host computer in the embodiment of the present invention.

FIG. 28 is a diagram explaining operation of the path switching program 213 of the primary host computer 200.

When the processor 220 in the primary host computer 200 receives data from the application program (AP) 211, the processor writes the data into an output queue 150. Further, the processor 220 extracts data from the output queue 150 and writes the data into data queue 152 alternately.

However, when the write destination is the same logical volume and when there is dependence relation between data, parallel access of data is impossible. In the former case, the data is written in the same data queue 152. Further, when the data communication path falls in a failure status and when the primary management computer 100 issues path unusable command on the basis of user's command, the processor makes it impossible to use the data queue pertinent to the data communication path. After changing the data queue to be unusable, the processor rewrites the data written in the data queue into the usable data queue.

Further, different logical volumes can pretend to be one logical volume. In this case, it is realized by assigning different data queues to one output queue. In order to realize this processing, the procedure for relating different logical volumes to one logical volume previously as if the different logical volumes were regarded as one logical volume is required. The relating processing is named path switching of data and is used in shifting procedure between apparatuses (named inter-apparatus migration).

Operation of the primary management computer 100 and the primary host computer 200 during the deputy copying is different from the procedure from time that copying is started to time that it is shifted to the regular copying as shown in FIG. 18.

Figure 29:
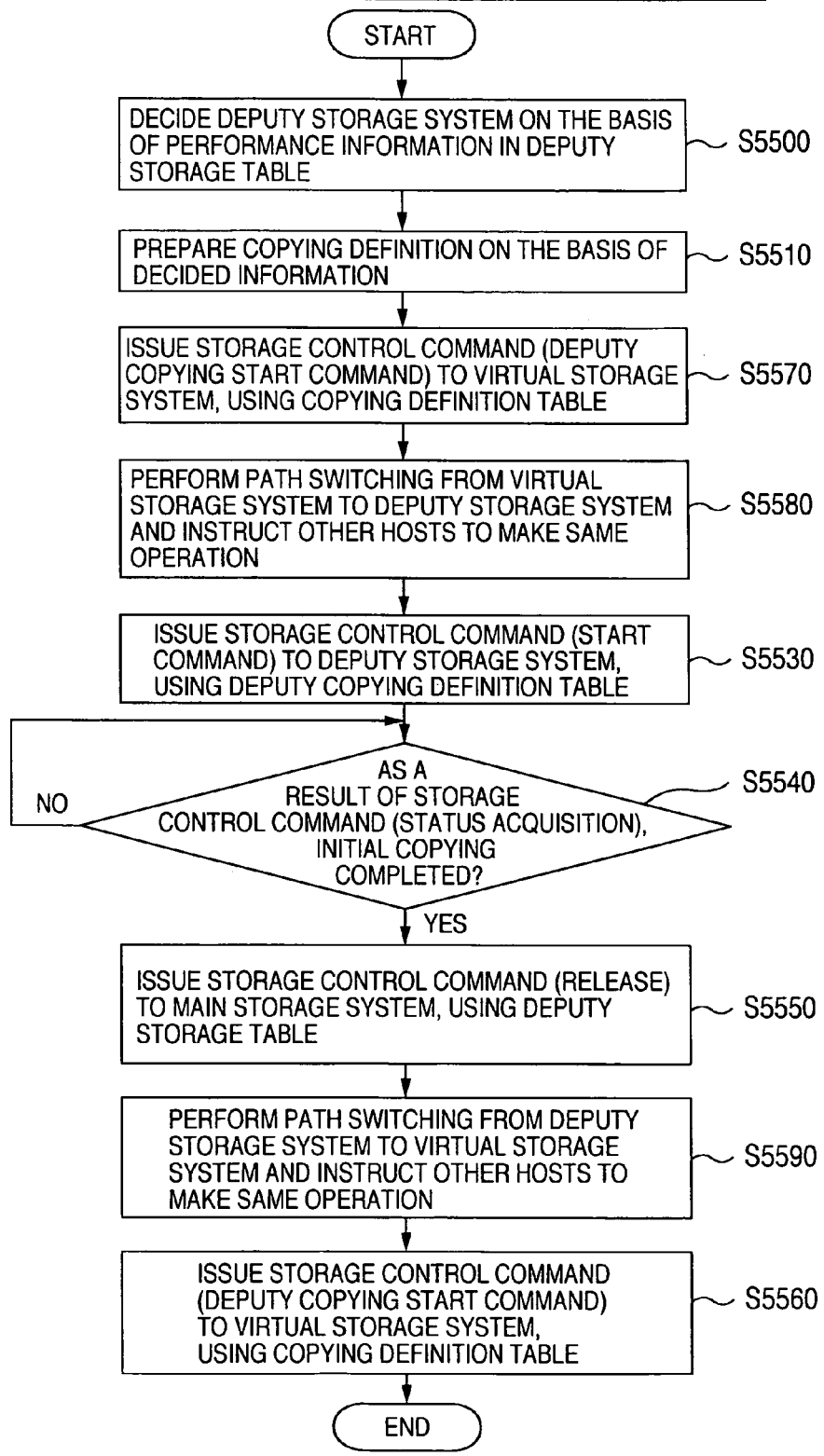
FIG. 29 is a flow chart showing a processing procedure from time that copying is started to time that it is shifted to regular copying in a second embodiment of the present invention.

FIG. 29 is a flow chart showing the procedure from time that copying is started to time that it is shifted to the regular copying.

The procedure shown in FIG. 29 is different from that of the first embodiment shown in FIG. 18 in processing operations in step S5520 and after steps S5520 and S5550. That is, the processor 120 issues the storage control command (purge command) to the primary storage system 1000a by means of the copying definition table 113 (step S5570). Further, after step S5520, the path switching from the primary storage system 1000a to the primary storage system 1000b is performed (step S5580).

For operation of the storage system during the deputy copying, the procedure of performing the path switching from the primary storage system 1000b to the primary storage system 1000a is added after step S5550 (step S5590).

Operation of the storage system during the deputy copying is different in the monitoring processing of write data of the virtual storage system and start of the regular copying by the virtual storage system.

Figure 30:
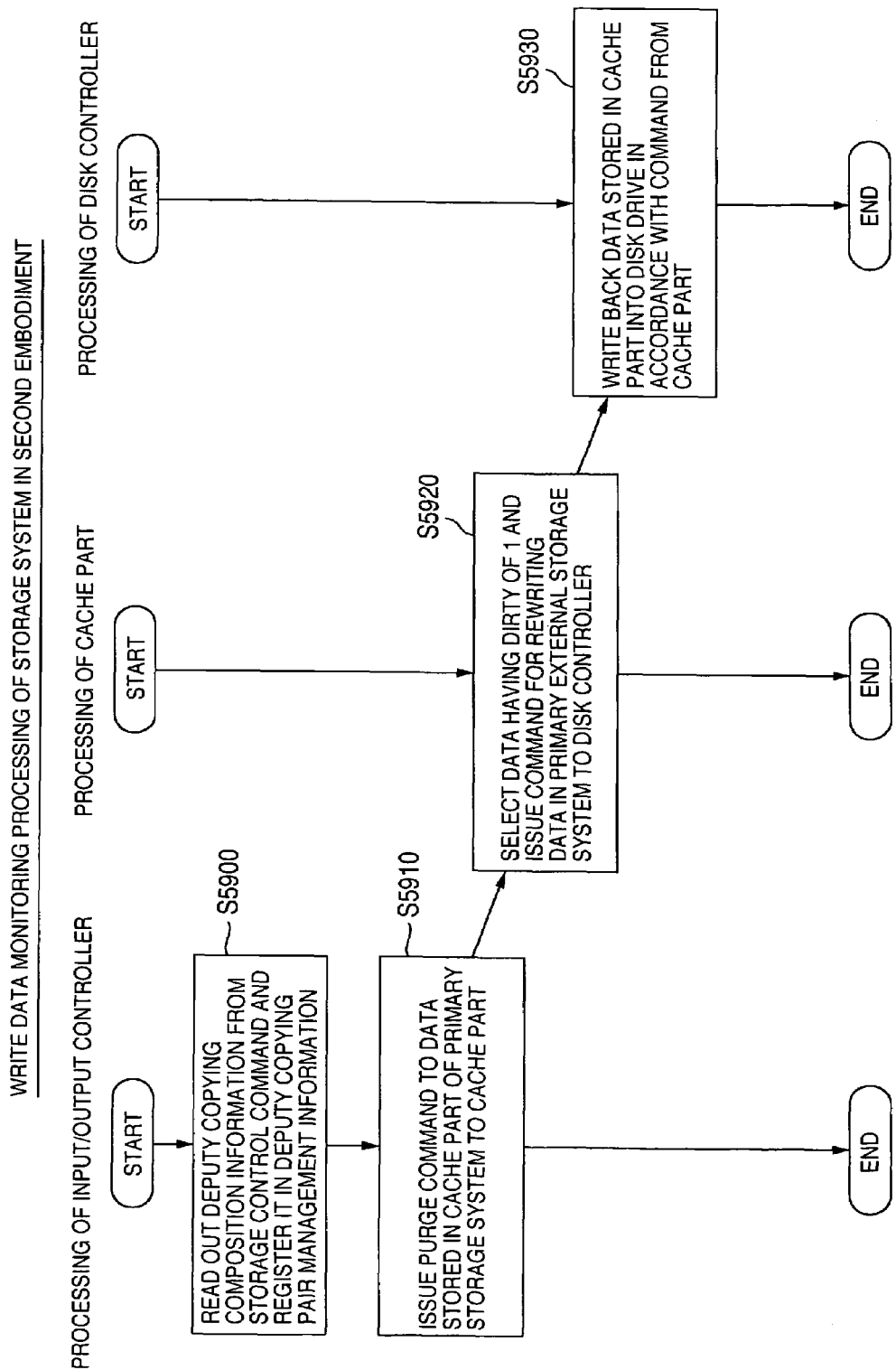
FIG. 30 is a flow chart showing write data monitoring processing of the storage system in the second embodiment of the present invention.

FIG. 30 is a flow chart showing write data monitoring processing of the storage system. Difference from the first embodiment is described. Since the host computer makes data access to the deputy storage system in the write data monitoring processing of the virtual storage system, the processing operation in step S5940 is not required.

Figure 31:
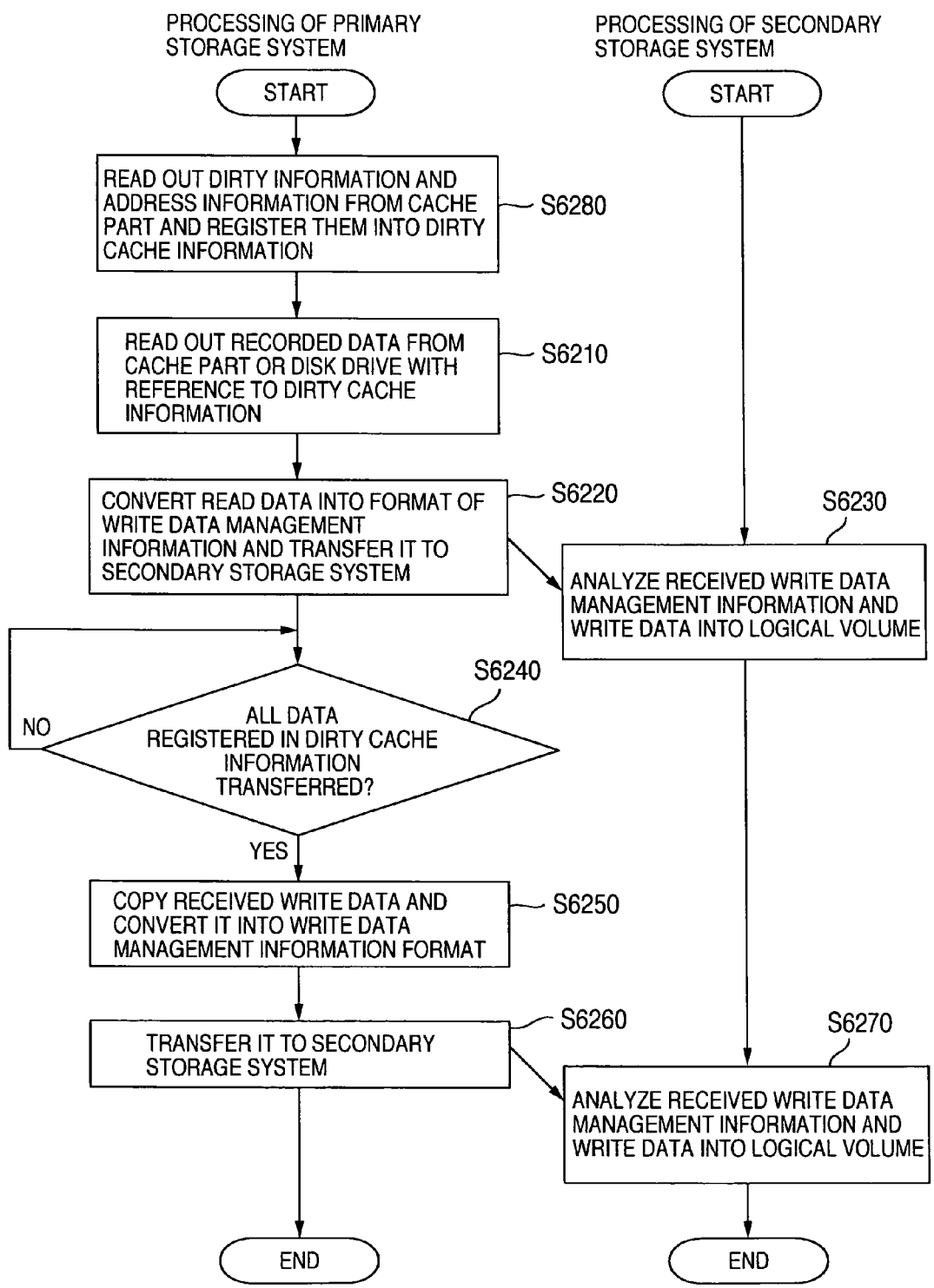
FIG. 31 is a flow chart showing a starting procedure of regular copying by the storage system in the second embodiment of the present invention.
Figure 32:
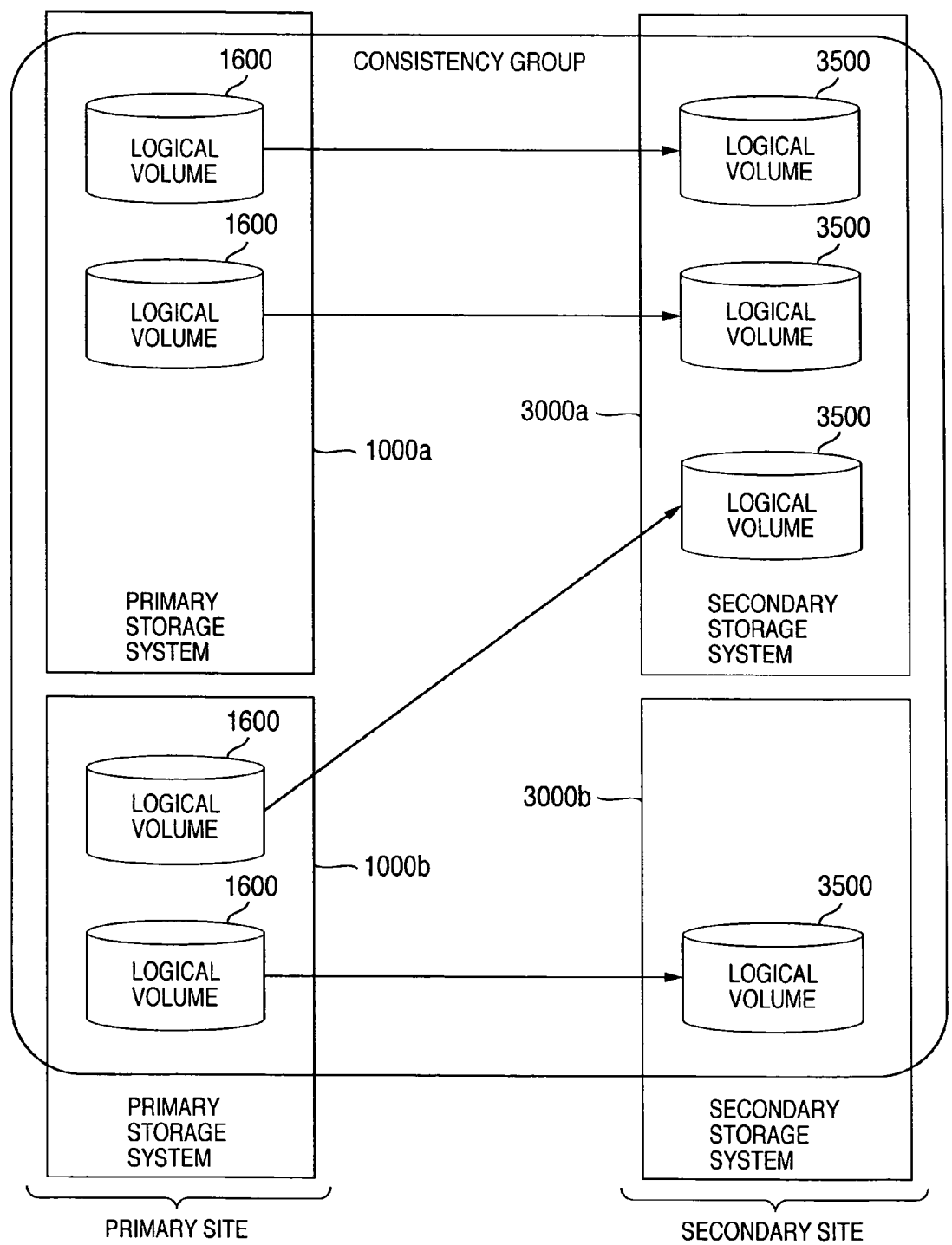
FIG. 32 is a diagram explaining consistency control operation by primary and secondary storage systems in the embodiment of the present invention.

FIG. 31 is a flow chart showing the starting procedure of regular copying by the storage system. Difference from the first embodiment is described. The processing in step S6200 is changed to the following processing. In the virtual storage system, the processor 1310a reads out Dirty information and Address information from the cache part and registers them in the dirty cache information (step S6280).

As described above, in the embodiment, the primary management computer 100 prepares the deputy copying definition so that the deputy storage system different from the storage system (virtual storage system) of original copying target can perform copying processing and instructs the virtual storage system to store the write information (differential information) of data, so that the initial copying is performed by the deputy storage system. After completion of the initial copying, the copying by the deputy storage system is ended and the virtual storage system copies the differential information into the secondary-side virtual storage system and then shifts the operation to the regular copying.

By using the above processing procedure, the initial copying can be performed in the deputy storage system different from the virtual storage system instructed to impose the load of the initial copying in the initial status of the remote copying and after shifting to the regular copying the remote copying can be performed by the storage system of originally instructed target, so that influence to the host computer using data of the virtual storage can be suppressed.

It is to be understood that various changes and modifications may be made widely in the invention described above without departing from the spirit and scope of the invention.

For example, the primary external storage system 2000 and the secondary external storage system 4000 may be directly connected to the network 500 as the deputy storage system and perform initial copying or regular copying between corresponding volumes. In this case, the primary external storage system 2000 and the secondary external storage system 4000 is one candidate for the deputy storage system.

Further, the primary and secondary management computers may be connected to the storage systems (primary storage systems 1000a, 1000b and secondary storage systems 3000a, 3000b) and the host computers (primary host computer 200 and secondary host computer 700) through a control network different from the data communication network 500.

In the embodiment described above, whether the remote copying is performed in the volume provided in the host computer or in a different volume is controlled in accordance with the load situation of the storage system.

In the case of the initial copying, for example, an amount of data transferred is increased to make the load heavy and accordingly the remote copying is performed by the storage system different from that having the volume provided in the host computer. In the case of the regular copying, since the amount of data transferred is reduced to make the load light, it is controlled to make copying while responding to an access request from the host computer. That is, the volume of copy target is changed in accordance with the status of the initial copying and the regular copying so that the initial copying is performed in a different volume (corresponding to deputy) and the regular copying is performed in the volume provided in the host computer.

Furthermore, in the embodiment, the computer system includes the management computer connected to the host computer, the first and second primary storage systems for storing data transmitted from the host computer, the first and second secondary storage systems being targets of remote copying of the first and second primary storage systems, respectively, the primary external storage system connected to the first and second primary storage systems, the secondary external storage system connected to the first and second secondary storage systems, the memory area or volume provided to the host computer, and the memory area on the primary site side during initial copying provided to the computer different from the host computer, so that the management computer controls in accordance with the load situation of the storage systems whether remote copying is performed in the memory area provided to the host computer or in the memory area different from that provided to the host computer.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A computer system comprising:
a computer;
a first primary storage system, connected to the computer, providing a first virtual storage area to the computer;
a second primary storage system connected to the first primary storage system and including a first real storage area;
a third primary storage system connected to the second primary storage system and providing a second virtual storage area,
wherein the first real storage area of said second primary storage system corresponds to both said first virtual storage area of the first primary storage system and said second virtual storage area of the third primary storage system;
a first secondary storage system connected to the first and second primary storage systems through a communication line and including a second storage area; and
a management computer connected to the first and second primary storage systems and the computer,
wherein the second primary storage system, responsive to a write request of write data to the first virtual storage area of the first primary storage system, received from the computer, stores the write data into the first real storage area;

wherein remote copying is conducted between the first real storage area of the second primary storage system and the second storage area of the first secondary storage system,
wherein the remote copying is classified into initial copying and regular copying,
wherein in the initial copying data is copied from the first real storage area to the second storage area to make contents of the first real storage area equal to contents of the second storage area, and in the regular copying write data received by the first primary storage system from the host computer is transferred to the first secondary storage system to be stored in the second storage area,
wherein when conducting the initial copying, the management computer instructs the second primary storage system to copy data stored in the first real storage area into the second storage area through the second virtual storage area, and
wherein when conducting the regular copying, the management computer instructs the first primary storage system to copy the write data received from the computer into the second storage area through the first virtual storage area.

2. A computer system according to claim 1, comprising:
a plurality of the first primary storage systems for providing the first virtual storage area, and
whererin the computer transmits the write request to any of the plurality of first primary storage systems.

3. A computer system according to claim 1, wherein the first primary storage system provides a plurality of the first virtual storage areas to the computer.

4. A computer system according to claim 1, comprising:
a plurality of the second primary storage systems, and
wherein the management computer acquires performance information of each of the second primary storage systems and specifies the second primary storage system based on the performance information and capacity of the first real storage area, generates relation information relating the second virtual storage area corresponding to the first real storage area provided by the specified second primary storage system to the second storage area, transmitting a copy start command together with the relation information to the specified second primary storage system, and
the second primary storage system receives the copy start command and starts to copy data into the second storage area in accordance with the relation information.

5. A computer system according to claim 4, wherein the performance information contains information indicating whether the second primary storage system is already copying data stored in any other of the first real storage area into any other of the second storage area or not.

6. A computer system according to claim 1, wherein the management computer issues a copying command for copying data into the second storage area through the first virtual storage area when processing for copying data into the second storage area through the second virtual storage area is completed.

7. A computer system according to claim 1, wherein when the write data received from the computer is produced during processing for copying data into the second storage area through the second virtual storage area, the first primary storage system holds a write destination address of the write data as differential information, and
whererin when the processing for copying data into the second storage area through the second virtual storage area is completed, the differential information is referenced to read out data stored in the address described in the differential information from the second virtual storage area and copy the data into the second storage area.

8. A computer system according to claim 1, further comprising:
second and third secondary storage systems each including a virtual storage area corresponding to a real storage area of the first secondary storage system.

9. A computer system according to claim 8, wherein the processing for copying data into the second storage area through the second virtual storage area ends the data copying processing when copying of all data into the second storage area is completed and writes all data stored in the virtual storage areas included in the second and third secondary storage systems and not stored in real storage area of the first secondary storage system into the second storage area.

10. A computer system according to claim 9, wherein when a command for starting processing for storing copied data in the first real storage area into the second storage area is issued from the management computer to the second primary storage system providing the first real storage area, data that is stored in the first real storage area and does not exist in the second primary storage system is written into the third primary storage system and
wherein a data access destination to the first real storage area by the computer is changed from the second primary storage system to the third primary storage system.

11. A management computer for making, through a network, management of:
a computer;
a first primary storage system for providing a first virtual storage area to the computer;
a second primary storage system connected to the first primary storage system and including a first real storage;
a third primary storage system connected to the second primary storage system and for providing a second virtual storage area,
wherein the first real storage area of said second primary storage system corresponds to both said first virtual storage area of the first primary storage system and said second virtual storage area of the third primary storage system.
wherein the second primary storage system, responsive to a write request of write data to the first virtual storage area of the first primary storage system, received from the computer, stores the write data into the first real storage area; and
a first secondary storage system connected to the first and second primary storage systems through a communication line and including a third storage area;
the management computer comprising:
a network interface capable of being connected to the network; and
a processor connected to the network interface,
wherein remote copying is conducted between the first real storage area of the second primary storage system and the second storage area of the first secondary storage system.
wherein the remote coDying is classified into initial copying and regular copying.
wherein in the initial copying data is copied from the first real storage area to the second storage area to make contents of the first real storage area equal to contents of the second storage area, and in the regular copying write data received by the first primary storage system from the host computer is transferred to the first secondary storage system to be stored in the second storage area, wherein when conducting the initial copying, the processor instructs the second primary storage system to copy data stored in the first real storage area into the third storage area through the second virtual storage area, and
wherein when conducting the regular copying, the management computer instructs the first primary storage system to copy the write data received from the computer into the second storage area through the first virtual storage area.

12. A storage system management method by a computer system including:
a computer;
a first primary storage system, connected to the computer, and providing a first virtual storage area to the computer;
a second primary storage system, connected to the first primary storage system, and including a first real storage area;
a third primary storage system, connected to the second primary storage system, and providing a second virtual storage area,
wherein the first real storage area of said second primary storage system corresponds to both said first virtual storage area of the first primary storage system and said second virtual storage area of the third primary storage system;
a first secondary storage system connected to the first and second primary storage systems through a communication line and including a third storage area; and
a management computer connected to the first and second primary storage systems and the computer;
wherein the second primary storage system, responsive to a write request to write data to the first virtual storage area of the first primary storage system, received from the computer, stores the write data into the first real storage area,
said storage system management method comprising the steps of:
instructing remote copying between the first real storage area of the second primary storage system and the second storage area of the first secondary storage system,
wherein the remote copying is classified into initial copying and regular copying,
wherein in the initial copying data is copied from the first real storage area to the second storage area to make contents of the first real storage area equal to contents of the second storage area, and in the regular copying write data received by the first primary storaae system from the host computer is transferred to the first secondary storage system to be stored in the second storage area,
wherein said instructing remote copying step comprises the steps of:
when conducting the initial copying, instructing the second primary storage system to copy data stored in the first real storage area into the third storage area through the second virtual storage area, and
when conducting the regular copying, instructing the first primary storage system to copy the write data received from the computer into the second storage area through the first virtual storage area.

13. A storage system management method according to claim 12, wherein the computer system further includes:
a plurality of the first primary storage systems for providing the first virtual storage area, and
wherein the computer transmits the write request to any of the plurality of first primary storage systems.

14. A storage system management method according to claim 12, wherein the first primary storage system provides a plurality of the first virtual storage areas to the computer.

15. A storage system management method according to claim 12, wherein the computer system further includes:
a plurality of the second primary storage systems, and
wherein the management computer acquires performance information of each of the second primary storage systems and specifies the second primary storage system based on the performance information and capacity of the first real storage area, generates relation information relating the second virtual storage area corresponding to the first real storage area provided by the specified second primary storage system to the second storage area, transmitting a copy start command together with the relation information to the specified second primary storage system, and
wherein the second primary storage system receives the copy start command and starts to copy data into the second storage area in accordance with the relation information.

16. A storage system management method according to claim 15, wherein the performance information contains information indicating whether the second primary storage system is already copying data stored in any other of the first real storage area into any other of the second storage area or not.

17. A storage system management method according to claim 12, wherein the management computer issues a copying command for copying data into the second storage area through the first virtual storage area when processing for copying data into the second storage area through the second virtual storage area is completed.

18. A storage system management method according to claim 12, wherein when the write data received from the computer is produced during processing for copying data into the second storage area through the second virtual storage area, the first primary storage system holds a write destination address of the write data as differential information, and
wherein when the processing for copying data into the second storage area through the second virtual storage area is completed, the differential information is referenced to read out data stored in the address described in the differential information from the second virtual storage area and copy the data into the second storage area.

19. A storage system management method according to claim 12, wherein the computer system further includes:
second and third secondary storage systems each including a virtual storage area corresponding to a real storage area of the first secondary storage system.

20. A storage system management method according to claim 19, wherein the processing for copying data into the second storage area through the second virtual storage area ends the data copying processing when copying of all data into the second storage area is completed and writes all data stored in the virtual storage areas included in the second and third secondary storage systems and not stored in real storage area of the first secondary storage system into the second storage area.

21. A storage system management method according to claim 20, wherein when a command for starting processing for storing copied data in the first real storage area into the second storage area is issued from the management computer to the second primary storage system providing the first real storage area, data that is stored in the first real storage area and does not exist in the second primary storage system is written into the third primary storage system and
wherein a data access destination to the first real storage area by the computer is changed from the second primary storage system to the third primary storage system.

* * * * *